(12) United States Patent
Jimenez Pino et al.

(10) Patent No.: US 12,074,470 B2
(45) Date of Patent: Aug. 27, 2024

(54) SYSTEM AND METHOD FOR SINGLE-STAGE ON-BOARD CHARGER POWER FACTOR CORRECTION REACTIVE CONTROL

(71) Applicant: Lear Corporation, Southfield, MI (US)

(72) Inventors: Rafael Jimenez Pino, Valls (ES);
Pablo Gaona Rosanes, Valls (ES);
Hector Sarnago Andia, Ólvega (ES);
Oscar Lucia Gil, Saragossa (ES)

(73) Assignee: Lear Corporation, Southfield, MI (US)

( * ) Notice: Subject to any disclaimer, the term of this patent is extended or adjusted under 35 U.S.C. 154(b) by 158 days.

(21) Appl. No.: 17/527,868

(22) Filed: Nov. 16, 2021

(65) Prior Publication Data
US 2022/0161673 A1    May 26, 2022

Related U.S. Application Data

(60) Provisional application No. 63/118,136, filed on Nov. 25, 2020.

(51) Int. Cl.
*H02M 3/335* (2006.01)
*B60L 53/22* (2019.01)
(Continued)

(52) U.S. Cl.
CPC .............. *H02J 7/02* (2013.01); *B60L 53/22* (2019.02); *H02M 1/0009* (2021.05);
(Continued)

(58) Field of Classification Search
CPC .. H02M 1/0009; H02M 1/4208; H02M 1/007; H02M 3/33584; H02J 7/02; H02J 2210/14; H02J 2210/10; H02J 2210/30
See application file for complete search history.

(56) References Cited

U.S. PATENT DOCUMENTS 5,687,070 A * 11/1997 Jacobs ................ H02M 1/4225
                                                              363/126
11,104,244 B2 * 8/2021 Mackenzie ............. H02J 7/342
(Continued)

FOREIGN PATENT DOCUMENTS

WO    WO-2017078115 A1 *  5/2017 .......... H02M 1/4208

OTHER PUBLICATIONS

German Office Action dated May 31, 2024 for German Application No. 102021130757.0 filed Nov. 24, 2021, 8 pgs.

*Primary Examiner* — Sisay G Tiku
(74) *Attorney, Agent, or Firm* — Brooks Kushman P.C.

(57) ABSTRACT

In at least one embodiment, a vehicle battery charger is provided. The vehicle battery charger includes at least one transformer, a first modular converter, a filter, and at least one controller. The first modular converter includes a first plurality of switching devices to generate a first voltage signal in response to a filtered input signal. A second plurality of switching devices generate a second voltage signal. The filter is operably coupled to the first modular converter and provides the filtered input signal to the first modular converter in response to a first input signal from a mains supply. The filtered input signal includes a detectable current portion and an undetected current portion. The controller is programmed to determine the undetected current portion based at least on a capacitance of the filter and generate a first control variable to compensate for the undetected current portion.

20 Claims, 12 Drawing Sheets

(51) Int. Cl.
*H02J 7/02* (2016.01)
*H02M 1/00* (2007.01)
*H02M 1/42* (2007.01)

(52) U.S. Cl.
CPC ..... *H02M 1/4208* (2013.01); *H02M 3/33584* (2013.01); *B60L 2210/12* (2013.01); *B60L 2210/14* (2013.01); *B60L 2210/30* (2013.01); *H02J 2207/20* (2020.01); *H02J 2310/48* (2020.01)

(56) References Cited

U.S. PATENT DOCUMENTS

| | | | |
|---|---|---|---|
| 11,368,037 B2* | 6/2022 | Jimenez Pino | H02M 3/33576 |
| 11,440,423 B2* | 9/2022 | Jimenez Pino | H03K 17/955 |
| 11,552,557 B2* | 1/2023 | Gaona Rosanes | H02M 1/0043 |
| 2013/0314038 A1* | 11/2013 | Kardolus | H02J 7/02 |
| | | | 320/109 |
| 2017/0005565 A1* | 1/2017 | Bai | H02M 1/4258 |
| 2018/0278149 A1* | 9/2018 | Sano | H02M 1/4225 |
| 2019/0061537 A1* | 2/2019 | Ge | B60L 50/51 |
| 2020/0195131 A1* | 6/2020 | Masich | H03K 3/0377 |
| 2022/0038019 A1* | 2/2022 | Gaona Rosanes | H02M 1/4258 |
| 2022/0161673 A1* | 5/2022 | Jimenez Pino | H02J 7/02 |
| 2022/0385087 A1* | 12/2022 | Sarnago Andia | H02J 7/02 |
| 2023/0182594 A1* | 6/2023 | Ge | H02J 7/02 |
| | | | 307/10.1 |
| 2023/0275519 A1* | 8/2023 | Prasantanakorn | H02M 1/007 |
| | | | 363/21.14 |

* cited by examiner

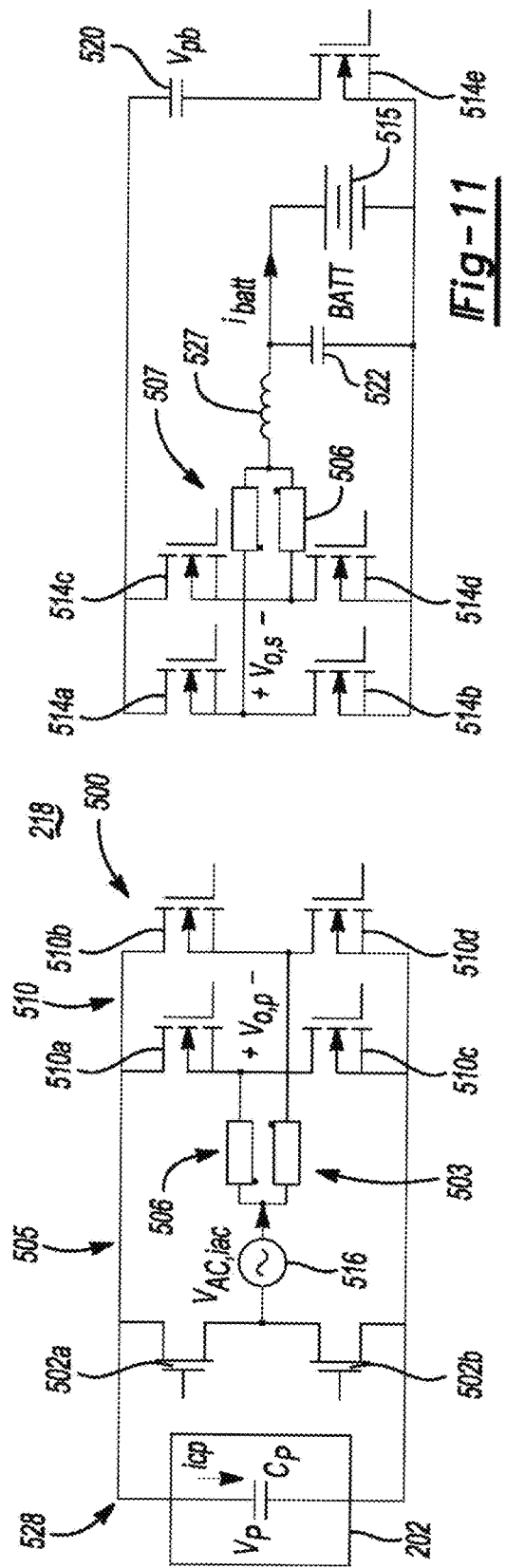
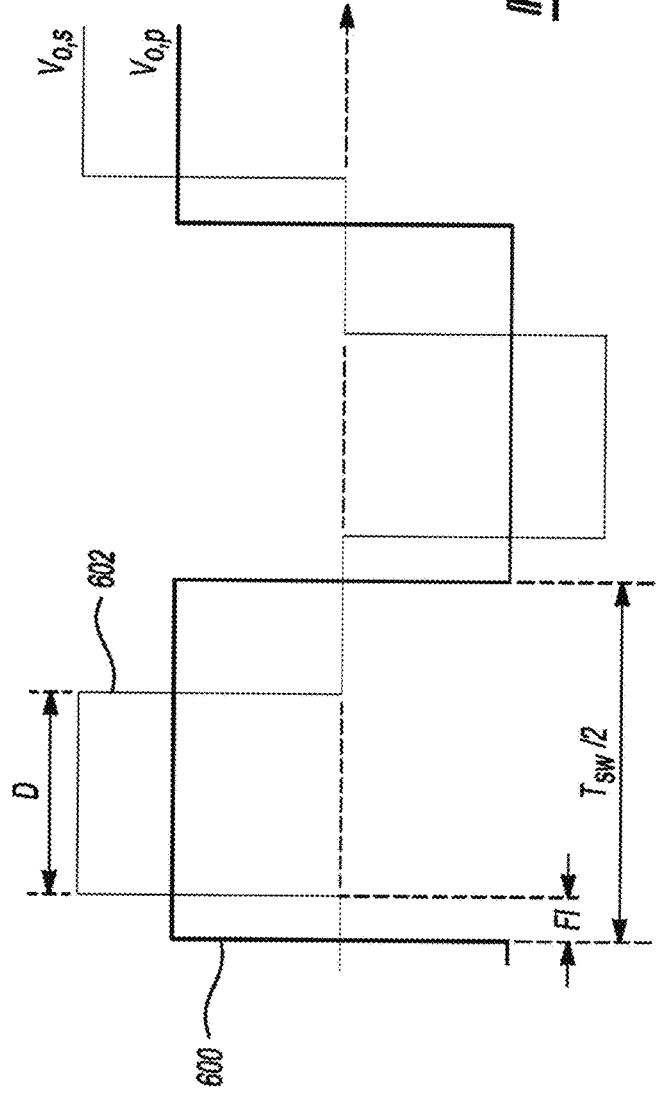
Fig-11
Fig-12

SYSTEM AND METHOD FOR SINGLE-STAGE ON-BOARD CHARGER POWER FACTOR CORRECTION REACTIVE CONTROL

CROSS-REFERENCE TO RELATED APPLICATIONS

This application claims the benefit of U.S. provisional application Ser. No. 63/118,136 filed Nov. 25, 2020, the disclosure of which is hereby incorporated in its entirety by reference herein.

TECHNICAL FIELD

Aspects disclosed herein may generally relate to a system and method for providing a single-stage on-board charger (OBC) power factor correction (PFC) reactive control. In one example, the disclosed OBC may be used in connection with vehicle on-board charging. These aspects and others will be discussed in more detail below.

BACKGROUND

An on-board charger (OBC) of an electric vehicle is used for charging a traction battery of the vehicle. The OBC converts electrical power absorbed from an AC power source into DC electrical power and charges the battery with the DC electrical power. Current single stage OBCs utilize a single-stage OBC that is capable to comply with International Organization Standard (ISO) 17409:2015. However, recent implementations are required to comply with ISO 17409: 2020.

SUMMARY

In at least one embodiment, a vehicle battery charger is provided. The vehicle battery charger includes at least one transformer, a first modular converter, a filter, and at least one controller. The least one transformer includes one or more primary windings and one or more secondary windings. The first modular converter includes a first active bridge having a first plurality of switching devices is positioned with the one or more primary windings on a primary side of the charger to generate a first voltage signal in response to a filtered input signal. A second active bridge including a second plurality of switching devices is positioned with the one or more secondary windings on a secondary side of the charger to generate a second voltage signal that is capable of being stored on one or more batteries on a vehicle in response to the first voltage signal. The filter is operably coupled to the first modular converter configured to provide the filtered input signal to the first modular converter in response to a first input signal from a mains supply. The filtered input signal includes a detectable current portion and an undetected current portion that is undetected by one or more current sensors. The at least one controller is programmed to determine the undetected current portion of the filtered input signal based at least on a capacitance of the filter and generate a first control variable to compensate for the undetected current portion based at least on the determined undetected current portion. The first control variable enables the vehicle battery charger to transfer power between the first active bridge and the second active bridge.

In at least another embodiment, a vehicle battery charger is provided. The vehicle battery charger includes at least one transformer, a first modular converter, a filter, and at least one controller. The least one transformer includes one or more primary windings and one or more secondary windings. A first modular converter including a first active bridge having a first plurality of switching devices is positioned with the one or more primary windings on a primary side of the charger to generate a first voltage signal in response to a filtered input signal. The second active bridge including a second plurality of switching devices is positioned with the one or more secondary windings on a secondary side of the charger to generate a second voltage signal that is capable of being stored on one or more batteries on a vehicle in response to the first voltage signal. The filter is operably coupled to the first modular converter and is configured to provide the filtered input signal to the first modular converter in response to a first input signal from a mains supply of a power grid. The filtered input signal includes a detectable current portion and an undetected current portion that is undetected by one or more current sensors. The at least one controller is programmed to determine the undetected current portion of the filtered input signal based at least on a capacitance of the filter and to generate a first control variable to compensate for the undetected current portion based at least on the determined undetected current portion.

In at least another embodiment, a vehicle battery charger is provided. The vehicle battery charger includes at least one transformer, a first modular converter, a filter, and at least one controller. The at least one transformer having one or more primary windings and one or more secondary windings. The first modular converter includes a first active bridge having a first plurality of switching devices being positioned with the one or more primary windings on a primary side of the charger to generate a first voltage signal in response to a filtered input signal. A second active bridge including a second plurality of switching devices is positioned with the one or more secondary windings on a secondary side of the charger to generate a second voltage signal that is capable of being stored on one or more batteries on a vehicle in response to the first voltage signal. The filter is operably coupled between a mains supply of a grid and the first modular converter. The filter is configured to provide the filtered input signal to the first modular converter in response to a first input signal from the mains supply. The filtered input signal includes a detectable current portion and an undetected current portion that is undetected by one or more current sensors. The at least one controller programmed to determine the undetected current portion of the filtered input signal based at least on a capacitance of the filter and to generate a first control variable to compensate for the undetected current portion based at least on the determined undetected current portion, wherein the first control variable enables the vehicle battery charger to transfer power between the first active bridge and the second active bridge.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 11 depicts one example of an OBC that exhibits a bi-directional current flow in accordance with one embodiment;

FIG. 12 illustrates a voltage output across a primary side of the OBC ($V_{o,p}$) and a voltage output across a secondary side of the OCB ($V_{o,s}$) in accordance with one embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Aspects disclosed herein generally provide for, but not limited to, an improvement in dual active bridge (DAB) control for on-board chargers to compensation for component tolerances that affect a requested Power Factor Correction (PFC) value. In addition, various control stages at a primary control of the DAB may compensate tolerances of capacitive components in a filter or the like. This aspect may correct alternating-current (AC) zero-crossing. An improvement in PFC performance at light-load conditions may be achieved in light of the aspects disclosed herein. Additionally, it is possible to now meet new ISO standards based on the aspects disclosed herein.

Figure 1:
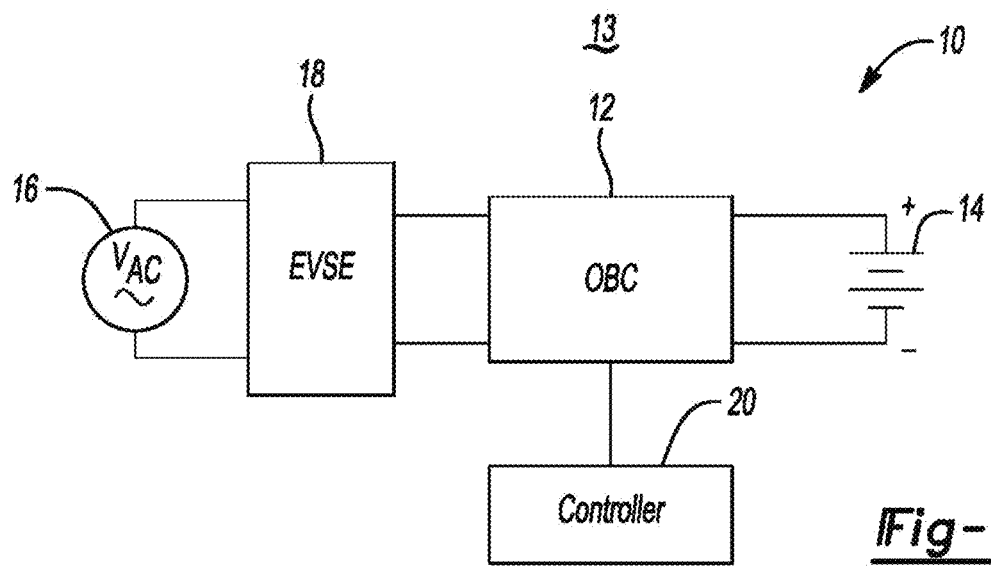
FIG. 1 depicts a block diagram of an electrical system having an on-board charger (OBC)

FIG. 1 generally illustrates a block diagram of an electrical system 10 having an on-board charger (OBC) 12. One example of an OBC is set forth in in pending U.S. application Ser. No. 16/682,398 ("the '398 application") entitled "ON-BOARD CHARGER (OBC) SINGLE-STAGE CONVERTER" as filed on Nov. 13, 2019 and published as (U.S. Publication No. 2021/0143665) the disclosure of which is hereby incorporated by reference in its entirety. The OBC 12 is generally positioned "on-board" an electric vehicle 13. The term "electric vehicle" herein may encompass any type of vehicle which uses electrical power for vehicle propulsion and encompasses battery-only electric vehicles (BEV), hybrid electric vehicles (HEV), plug-in hybrid electric vehicles (PHEV), and the like. The OBC 12 may be used for charging a traction battery 14 of the electric vehicle 13. The traction battery 14 may be a high voltage (HV) direct current (DC) traction battery as dictated per electrical energy requirements for electric vehicle propulsion.

The electrical system 10 further includes an alternating (AC) power source such as a mains supply 16 of an electrical grid. The OBC 12 charges the traction battery 14 using electrical power from the mains supply 16. The OBC 12 includes an input that connects to the mains supply 16, via an external Electric Vehicle Supply Equipment (EVSE) 18, to absorb electrical power from the mains supply 16. The OBC 12 includes an output that connects to the traction battery 14. The OBC 12 converts electrical power absorbed from the mains supply 16 into DC electrical power and charges the traction battery 14 with the DC electrical power.

A controller 20 is operably coupled to the OBC 12. The controller 20 may be an electronic device such as at least one processor, at least one micro-controller, or the like (e.g., a computer) that is positioned on-board the electric vehicle 13. The controller 20 may be defined as a vehicle controller. The controller 20 is operably coupled to the OBC 12 to control operations of the OBC 12. The controller 20 controls the OBC 12 to convert electrical power from the mains supply 16 into DC electrical power and charging traction battery 14 with the DC electrical power. For example, the controller 20 selectively controls switching and switching duration of power switches (not shown) positioned in the OBC 12. The power switches may be used to convert electrical power received from the mains supply 16 into a predetermined amount of DC electrical power. The controller 20 may communicate and control other nodes of the electrical system 10 and the electric vehicle 13 including nodes involved in the charging applications.

Various OBCs may include a dual stage architecture including a power factor corrector (PFC) and a DC/DC converter (not shown). The PFC and the DC/DC converter may be electrically coupled via a capacitive energy buffer (or a "DC link capacitor") (also not shown). The PFC may be connectable to the mains supply 16 and the DC/DC converter is connected to the traction battery 14. The PFC performs the AC/DC conversion and is controlled by the controller 20 to ensure a high-power factor at the input. The controller 20 controls the DC/DC converter to convert a high-voltage stabilized input at the DC link capacitor into a DC battery level for the traction battery 14. In this regard, the DC/DC converter adapts the output voltage/current to the requirements of the traction battery 14. In sum, the PFC functions as the grid front end and the DC/DC converter adapts the output to the range of the traction battery 14.

The PFC generally includes one or more inductors that may be bulky and costly. The energy conversion scheme of ordinary OBCs inherently requires an energy storage element to store/provide the difference between the instantaneous input power, which is sinusoidal to comply with electromagnetic compatibility (EMC) standards, and the output power, which is expected to be constant. Presently, due to high-power requirements, the energy storage element utilized may be involve a configuration of electrolytic capacitors (e.g., the DC-link capacitor). The high capacity that may be required may generally lead to bulky capacitors (i.e., the DC link capacitor) which reduces power density (for example, around 30% volume) and has significant implications on the maximum operating temperature and estimated lifetime (e.g., mean time between failures (MTBF)).

Additionally, a PFC and a DC/DC converter may be present for each rail of the OBC 12. Thus, a 3-phase, ordinary OBC may include three sets of PFCs and DC/DC converters. As described above, each set includes several energy storage elements. Namely, each rail includes one or more inductors at the PFC stage and electrolytic capacitors at the DC/DC converter stage. This aspect may lead to relatively poor power density and relatively poor MTBF and increased cost.

Figure 2:
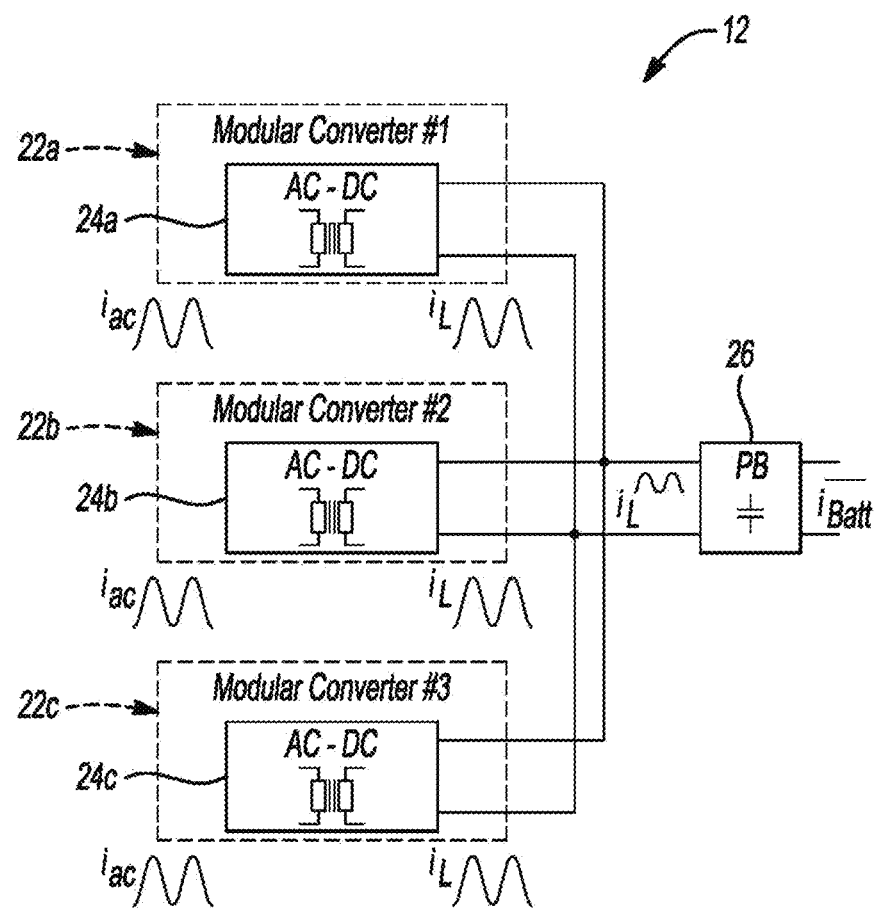
FIG. 2 depicts a block diagram of the OBC in which the OBC is a three-phase OBC.

Referring now to FIG. 2, with continual reference to FIG. 1, a block diagram of the OBC 12 is shown. The OBC 12 may be an n-phase OBC, where n is an integer of at least one. In the embodiment illustrated in FIG. 2, the OBC 12 may be a 3-phase OBC having first, second, and third rails 22a, 22b, and 22c.

The rails 22a, 22b, 22c may each include the same type of electrical circuitry in the form of a "modular converter" including an AC/DC converters 24a, 24b, 24c, respectively. Each AC/DC converter 24a, 24b, 24c is a single stage topology. Thus, unlike ordinary OBCs having a dual stage architecture including a PFC, a DC link capacitor, and a DC/DC converter for each rail, the OBC 12 may include a single stage architecture including an AC/DC converter for each rail 22a, 22b, 22c.

The OBC 12 further includes a pulsating buffer (PB) converter 26. The PB converter 26 is shared by AC/DC converters 24a, 24b, 24c. Particularly, the AC/DC converters 24a, 24b, 24c may be individually cascade-connected to the PB converter 26 as illustrated in FIG. 2. The AC/DC converters 24a, 24b, 24c are connectable at their respective input ends to the mains supply 16 and are connected at their respective output ends to the input end of PB converter 26. The output end of the PB converter 26 is connected to the traction battery 14. The AC/DC converters 24a, 24b, 24c together with the PB converter 26 function to convert electrical power from mains supply 16 into DC electrical power for charging traction battery 14. More particularly, the controller 20 controls the operation of the AC/DC converters 24a, 24b, 24c and the operation of the PB converter 26 according to control strategies for the OBC 12 to convert electrical power from the mains supply 16 into DC electrical power for charging the traction battery 14.

The AC/DC converters 24a, 24b, 24c include the same type of electrical circuitry and function the same. Thus, only the AC/DC converter 24a will be described in greater detail. In general, the AC/DC converter 24a includes a converter topology which neglects the use of a classical PFC and its associated inductor. The AC/DC converter 24a may be combined with the pulsating buffer (PB) converter 26 to maximize the use of an energy storage capacitor (e.g., the energy storage capacitor is in parallel with the converter 26) with the traction battery 14. This aspect may significantly reduce the capacitor size requirements.

In operation, the AC/DC converter 24a directly converts input AC from the mains supply 16 into a DC voltage and a positive oscillating current (i.e., "current ripple"). The input AC from the mains supply 16 is sinusoidal as understood. The output of AC/DC converter 24a is a DC voltage and a current ripple. The PB converter 26 post-processes the DC voltage and current ripple output of the AC/DC converter 24a to preferably eliminate or substantially eliminate (or minimize or at least reduce) the current ripple and transform the output of the AC/DC converter 24a into a battery level DC output.

Figure 3:
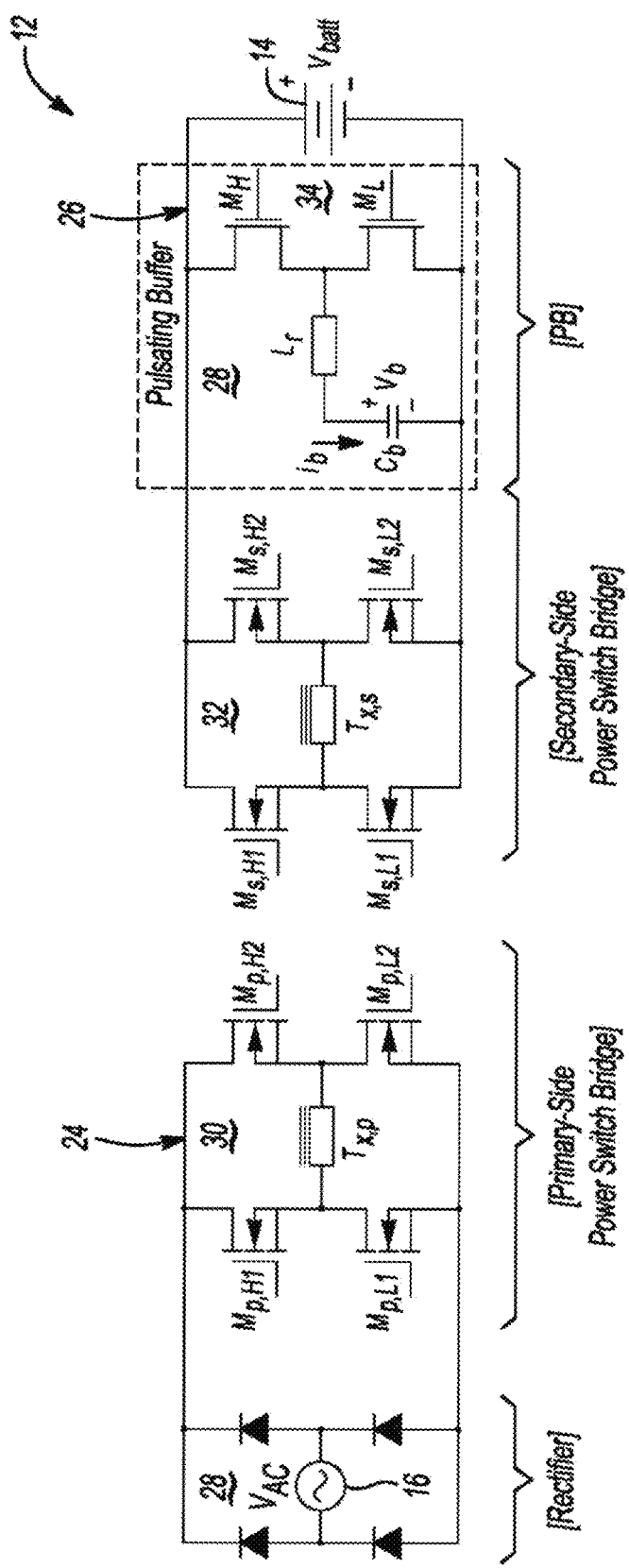
FIG. 3 depicts an electrical schematic diagram of the OBC in which the OBC is a single-phase OBC in accordance with an embodiment.

Referring now to FIG. 3, with continual reference to FIGS. 1 and 2, an electrical schematic diagram of the OBC 12 in which the OBC 12 is a single-phase OBC is shown. The depiction of the OBC 12 in FIG. 3 represents a single-phase direct OBC implementation (unidirectional). As shown in FIG. 3, the OBC 12 includes an AC/DC converter 24 and pulsating buffer (PB) converter 26. The AC/DC converter 24 is connected to the mains supply 16. The PB converter 26 is connected to the traction battery 14.

As further shown in FIG. 3, the AC/DC converter 24 includes a group of four diodes which form a full-diode bridge rectifier 28 at the front end of the AC/DC converter 24. The rectifier 28 is connected to the mains supply 16 to rectify the AC input for the AC/DC converter 24. The AC/DC converter 24 further includes a first group of four power switches which form a primary-side power switch bridge 30 on a primary-side of a transformer Tx. The AC/DC converter 24 further includes a second group of four power switches which form a secondary-side power switch bridge 32 on a secondary-side of the transformer Tx. In a refinement, the multiple secondary-side power switch bridges 32 may be provided on the secondary-side of the transformer Tx (each preferably with a separate secondary coil of Tx).

The AC/DC converter 24 with primary-side and secondary-side power switch bridges 30, 32 on respective sides of the transformer Tx includes a structure based on a dual-active bridge (DAB) topology. The controller 20 controls the power switch bridges 30, 32 to convert the rectified voltage that is inputted from the rectifier 28 into the DC voltage and current ripple output. The DC voltage and current ripple output is outputted from the AC/DC converter 24 to the PB converter 26.

As further shown in FIG. 3, the PB converter 26 includes a pair of power switches 34, an inductor Lr, and an energy storage capacitor Cb. The PB converter 26 thus has a current ripple processing based on pulsating buffer topology. The PB converter 26 receives the current ripple outputted from the AC/DC converter 24. The controller 20 controls the pair of power switches 34 to eliminate the current ripple and transform the output of AC/DC converter 24 into a battery level DC output for charging traction battery 14.

As shown in FIG. 3, the power switches of the primary-side and the secondary-side power switch bridges 30, 32 of AC/DC converter 24 and the power switches of the power switch pair 34 of PB converter 26 are MOSFETs.

In the OBC 12, only a single magnetic component, i.e., the transformer Tx, is in the DC/DC block of the AC/DC converter 24. The PB converter 26 replaces the DC link capacitor compensation function of an ordinary OBC. The PB converter 26 compensates the current ripple outputted from the AC/DC converter 24 to the PB converter 26 to provide a smooth DC output voltage to thereby significantly reduce the size of the energy storage capacitor Cb of the PB converter 26.

As indicated, the OBC 12 shown in FIG. 3 is unidirectional in that power flow from the mains supply 16 to the AC/DC converter 24 to the PB converter 26 to the traction battery 14. However, the OBC 12 can be bidirectional. For instance, the OBC 12 may be made bidirectional by replacing the diodes of rectifier 28 of AC/DC converter 24 with active switches, such as MOSFET switches to provide for a bidirectional rectifier. Consequently, the topology of OBC 12 can be implemented using a synchronous rectifier (bidirectional) enabling a bidirectional power flow: grid-to-vehicle (G2V) and vehicle-to-grid (V2G).

Figure 4:
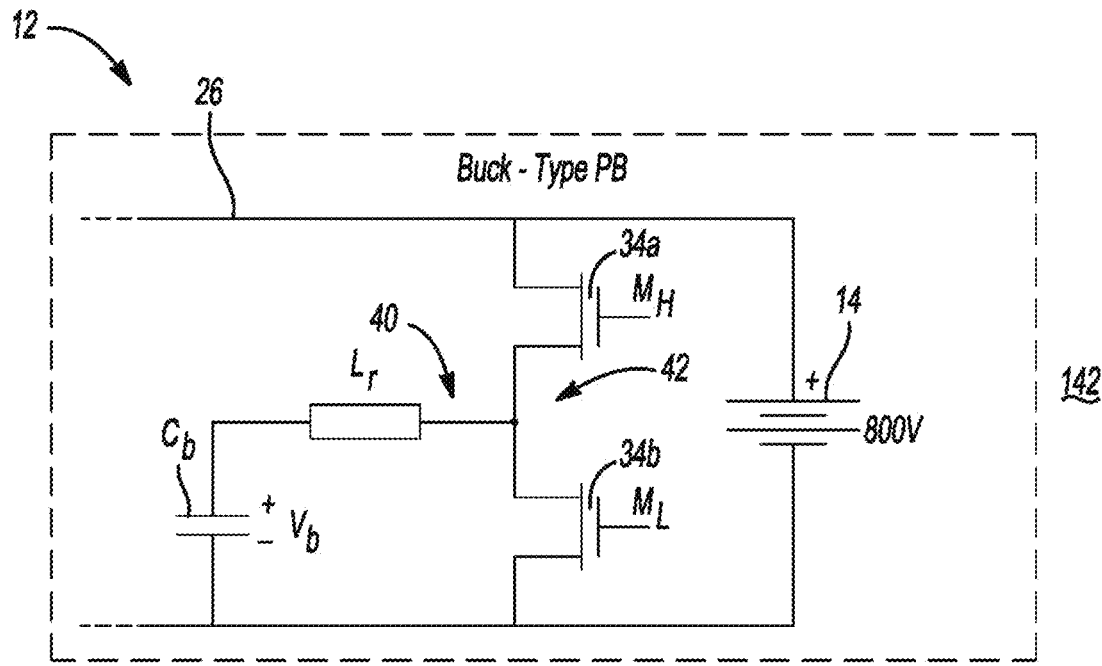
FIG. 4 depicts a more detailed example of a pulsating buffer (PB) converter shown in FIG. 3 in accordance with one embodiment.

FIG. 4 depicts a more detailed example of the PB converter shown 26. In one example, the PB converter 26 may be implemented as a buck-type PB converter 26. In this case, the PB converter 26 may step down the DC voltage provided by one or more of the AC/DC converters 24a, 24b, 24c to the traction battery 14.

As noted above, the PB converter 26 includes a plurality of power switches 34a and 34b, an inductor Lr, and an energy storage capacitor Cb. The PB converter 26 thus has a current ripple processing based on pulsating buffer topology. The PB converter 26 receives the current ripple outputted from the AC/DC converter 24. The controller 20 controls the power switches 34a, 34b to eliminate the current ripple and transform the output of AC/DC converter 24 into a battery level DC output for charging traction battery 14. The buck type PB converter 26 generally includes the capacitor Cb being in series with the inductor Lr thereby forming a first branch 40. The branch 40 is in parallel with the power switch 34b to form a second branch 42. The first switch 34a is in series the first branch 40 and the second branch 42. The layout or arrangement of the PB converter 26 as noted directly above yields an overall reduction of current at 400 Volts from approximately 61 A to approximately 31 A.

The capacitor Cb is connected in parallel between a secondary-side power switch bridge (not shown) and is included in the PB converter 26. A first terminal of the first switch 34a connects to a node. In this node, Kirchoff law applies where I(power bridge)+I(PB)+ios=0. The same applies to a node formed between the power switch 34a, 34b and the inductor Lr. The current that flows to the capacitor Cb flows through the inductor Lr. Vos is shared between the output of the power switch bridge (not shown), the PB converter 26, and the output battery.

The PB converter 26 draws a buffer current associated with a buffer voltage from capacitor Cb and controls the operation of pair of the power switches 34a, 34b of the PB converter 26 for the PB converter 26 to draw a requisite amount of buffer current associated with the buffer voltage and generate therefrom a targeted, battery voltage/current. The targeted, battery voltage/current is output from the PB converter 26 to charge the traction battery 14. In general, the PB converter 26 is arranged to operate in the 800V domain 142 (e.g., 450-850 V) while at the same time utilize a reduced amount of current. For example, the OBC 12 may operate in the 800V domain.

Figure 5:
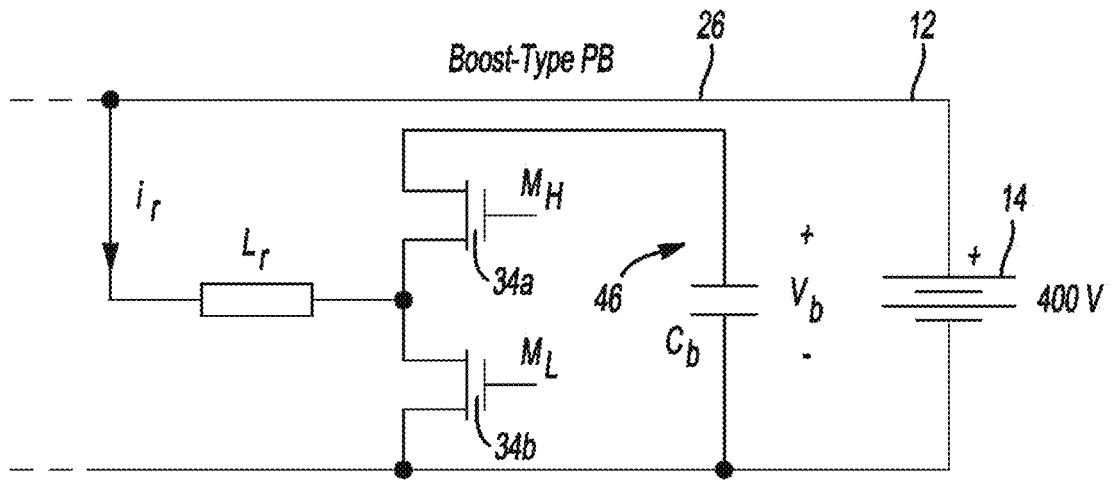
FIG. 5 depicts another PB converter in accordance with one embodiment.

FIG. 5 depicts another PB converter 12 in accordance with one embodiment. In one example, the PB converter 26 may be implemented as a boost-type PB converter 26. The PB converter 26 includes the plurality of power switches 34a and 34b, the inductor Lr, and the energy storage capacitor $C_b$. The boost type PB converter 26 includes the inductor Lr being in series with the power switch 34a and the power switch 34b. The switch 34a and the capacitor Cb are in series with one another and form a first branch 46 (or first node). The branch 46 in parallel with the power switch 34b. The layout or arrangement of the PB converter 26 as noted directly above yields an overall reduction of current at 400 Volts to approximately 15 A.

The voltage at the capacitor $C_b$, may operate at a higher voltage and then with the same energy flow, at a lower current (see directly above). Such a lower current minimizes losses thereby increasing efficiency. For example, the energy stored in the inductance Lr is used to boost the voltage from the battery 14 to a higher voltage in the capacitor $C_b$. Consequently, due to the boost operation of the PB converter 26, the voltage of the capacitor $C_b$, may be higher than the voltage of the battery 14. This high voltage operation may ensure a low current through the PB converter 26 and, consequently, highly efficient operation. The PB converter 26 may reduce current levels for a 400V OBC variant. In general, the PB converter 26 in the boost mode entails a high voltage at the capacitor $C_b$, and for power devices. The PB converter 226 may be more suited for 400-V batteries rather than 800-V batteries.

Figure 6:
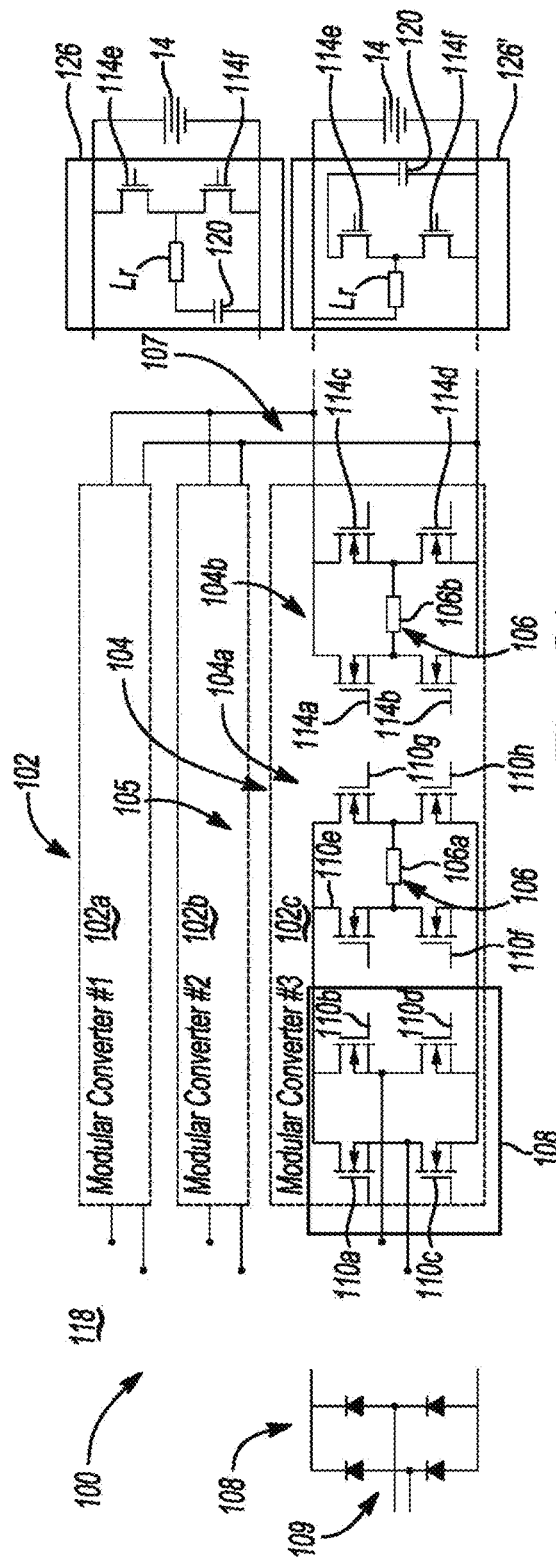
FIGS. 6A and 6B each depict a system formed by modular converters (or modular converters) with each modular converter having dual active bridge (DAB) stages in accordance with one embodiment.

FIG. 6A depicts a system 100 formed by modular converters 102 (or modular converters 102a-102c) with each modular converter 102 having dual active bridge (DAB) stages 104a, 104b in accordance with one embodiment. The modular converter 102 includes a transformer 106 having a primary transformer 106a (e.g., primary side of transformer 106), a secondary transformer 106b (e.g., secondary side of transformer 106), and a rectifier 108. The rectifier 108 is formed of a full bridge diode network 109 or a rectifier 108 that is formed of a full bridge switching circuit formed by switches 110a-110d. A controller 118 may control the switching states of the switches 110a-110d of the rectifier 108. For example, in the event the converter 102 includes the rectifier 108 that is formed of the diode network 109, such a diode network 109 is not part of the DAB stage 104a and the rectifier 108 enables unidirectional power transfer. Conversely, in the event the converter 102 includes the rectifier 108 that is formed of by the switches 110a-110d, such switches 110a-110d enable bi-directional power transfer. FIG. 6A also illustrates a first PB converter 126 and a second PB converter 126'. It is recognized that system 100 may include either the first PB converter 126 or the second PB converter 126'.

The first PB converter 126 includes a capacitor 120, switches 114e-114f, and the inductor Lr. The second PB converter 126' includes the capacitors, the switches 114e-114f, and the inductor Lr. The first PB converter 126 or the second PB converter 126' cooperates with the DAB stage 104b to convert energy for storage. The selection of whether the first PB converter 126 or the second PB converter 126' is implemented depends on the output voltage that is desired to be stored on the battery 14. The DAB stage 104a includes switches 110e-110h that are operably coupled to the primary transformer 106a. The DAB stage 104b includes switches 114a-114d that are operably coupled to the secondary transformer 106b.

FIG. 6B depicts a system 100' formed by modular converters 102 (or 102a-120c) with dual active bridge (DAB) stages 104a, 104b in accordance with one embodiment. The system 100' is generally similar to the system 100 of FIG. 6A. However, there are some differences. For example, the diode network 109 in the system 100' is implemented as a half bridge diode network (the diode network 109 in the system 100 is implemented as a full bridge diode network). As noted above, in the event the system 100' includes the rectifier 108 that is formed of the diode network 109, such a diode network 109 is not part of the DAB stage 104a and enables unidirectional power transfer. Conversely, in the event the system 100' includes the rectifier 108 that is formed of by the switches 110a-110b, such switches 110a-110b (i.e., the rectifier 108) enable bi-directional power transfer. It is recognized that system 100' may include either the first PB converter 126 or the second PB converter 126'.

The DAB stage 104a includes switches 110c-110f that are operably coupled to a top point of the primary transformer 106a. A middle point 136 of the transformer 106 is coupled to the mains supply. As noted above, the first PB converter 126 or the second PB converter 126' is combined from a functional perspective with the DAB stage 104b. The selection of whether the first PB converter 126 or the second PB converter 126' is implemented depends on the output voltage that is desired to be stored on the battery 14. The DAB stage 104a includes switches 110c-110f that are operably coupled to the primary transformer 106a. The DAB stage 104b includes switches 114a-114d that are operably coupled to the secondary transformer 106b.

A shown, the system 100' generally provides for a reduction in the number of switches (e.g., a total of 6 switches) in comparison to the total of 8 switches as shown in connection with FIG. 6A and results in the achievement of higher efficiency. In addition, the system 100' provides bi-directional features by replacing diodes with various the switching devices 110a-110b. The system 100 as illustrated in FIG. 6B provides an input rectifier 108 or 109 combined with primary full bridge (e.g., the DAB stage 104a), and transformer primary 106a (e.g., with two windings and the middle point 136). The PB converter, 126 (or 126') is separate from the secondary full bridge (e.g., the DAB stage 104b). Aspects disclosed herein generally provide for the combination of the PB converter 126 onto the second side 107 of the structure 102.

Figure 7:
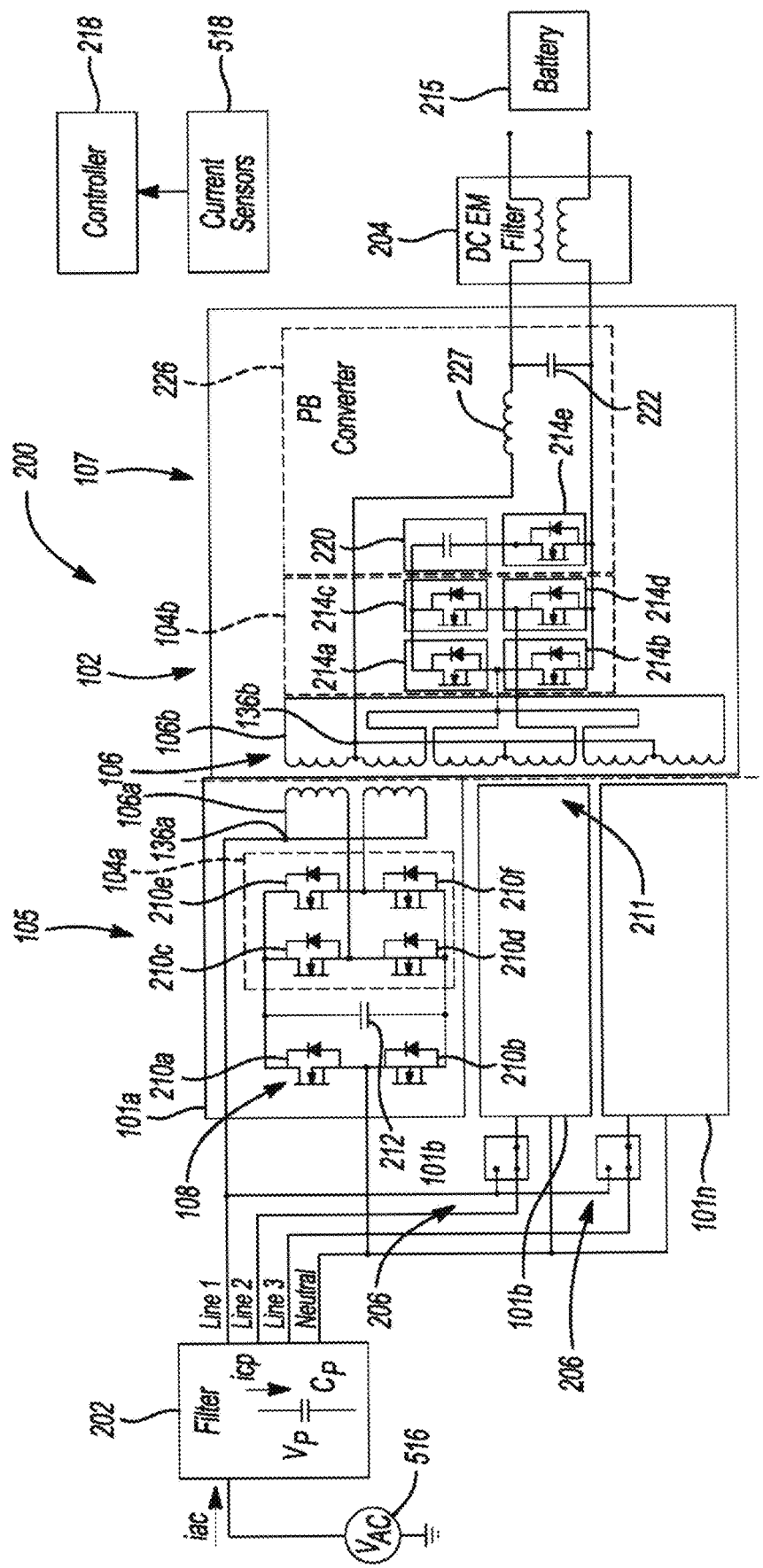
FIG. 7 depicts an apparatus for a single stage OBC (e.g., 11 kW 400V variant) with an integrated PB in accordance with one embodiment.

FIG. 7 depicts an apparatus 200 for a single stage OBC (e.g., 11 kW 400V variant) with an integrated PB converter 226 in accordance with one embodiment. The apparatus 200 generally includes a plurality of modular converters 101a-101n (or "101"). Each corresponding modular converter 101 includes the rectifying half bridge structure 108 and the DAB stages 104a, 104b. Each of the modular converters 101 also includes one transformer 106 (e.g., a single transformer 106 with two primary windings 106a (or primary-side transformer 106a) positioned on the primary side 105 and two or more secondary windings (or secondary-side transformer 106b) positioned on the secondary side 107, and a PB converter 226. In general, there is one transformer 106 per modular converter 101 and each transformer 106 includes a primary with two coils or windings 106a (with a middle point 136a) (or the two primary windings 106a) and a secondary with two coils or windings 106b (with a middle point 136b) (or the two secondary windings 106b). FIG. 7 illustrates the details for the modular converter 101a which includes the primary transformer 106a and the secondary transformer 106b and a number of other features. While FIG. 7 illustrates the additional modular converters 101b-101n, it is recognized that each of these modular converters 101b-101n include similar features to that depicted as shown in the modular converter 101a. It is recognized that the primary windings 106a is only illustrated for the modular converter 101a and is not illustrated for the remaining modular converters 101b-101n. Similarly, it is recognized that the secondary windings 106b is illustrated in FIG. 7 for all modular converters 101a-101n.

The apparatus 200 includes a first filter 202, a second filter 204, and a plurality of switching devices 206. The first filter 202 is operably coupled to the primary side 105 of each converter 101. The second filter 204 is operably coupled to the secondary side 107 that is common to all converters 101. The first filter 202 may be an AC electromagnetic interference (EMI) filter used to comply with EMC (electromagnetic compatibility) standards. The first filter 202 will be discussed in more detail below.

The second filter 204 may be a DC EMI filter used to ensure smooth output current supplied to the battery 215. The second filter 204 may be implemented in a number of OBC designs for the Automotive market. It is recognized the number of modular converters 101 implemented in the disclosed apparatus 200 may vary based on the desired criteria of a particular implementation.

Each of the converters 101 includes a plurality of switches 210a-210f ("210") and a capacitor 212. The rectifier 108 is formed via the switches 210a-210b. The plurality of switches 210 and the capacitor 212 are operably coupled to the primary-side transformer 106 for each the modular converters 101. The operation of the apparatus 200 is similar to that described above. For example, the rectifier 108 which includes the switches 210a and 210b provides a rectified output voltage or current in response to an output provided by the first filter 202. The rectifier 108 provides the rectified output voltage to the primary side 105. At least one controller 218 (hereafter "the controller 218") controls the switches 210 to provide a requisite amount of rectified output current associated from the rectified output voltage from the rectifier 28 to generate a primary-side output voltage or current on the primary-side transformer 106a.

The switches 210c-210f on the primary side 105 receive the rectified output voltage/current from the rectifier 108. As will be described in greater detail below, the controller 218 controls the operation of the primary-side power switch bridge (or the switches 210c-210f) to draw a requisite amount of rectified output current associated with the rectified output voltage from the rectifier 108 and generate therefrom a primary-side output voltage on primary-side transformer 106a. The controller 218 controls the switches 214a-210d to generate a secondary-side input voltage/current on the secondary-side 107 (or on the secondary-side transformer 106b).

The PB converter 226 includes the switch 214e, capacitors 220 and 222, and an inductor 227. Capacitor 222 is a bus capacitor that is used to decouple electrical devices on the PB converter 226. Inductor 227 and the capacitor 220 forms a resonant tank that ensures soft switching and to store energy. The capacitor 220 is charged with the secondary side input voltage or current and thus supplies the secondary side input voltage or current. The PB converter 226 draws a buffer current associated with a buffer voltage from the capacitor 220 which is provided to the battery 215 via the second filter 204. The controller 218 controls the operation of the power switches 214a-214d. The power switches 214a-214d are on the secondary side 107 and switch 214e along with the capacitor 220. Thus, in this regard, a portion of the PB converter 226 (e.g., the switch 214e and the capacitor 220) is combined together with the switches 214a-214d (or the DAB stage 104b) on the secondary side 107. The PB converter 226 draws a requisite amount of buffer current associated with the buffer voltage and generate therefrom a targeted, battery voltage/current. The PB converter 226 generates the required current to eliminate a current ripple that may have a frequency of, for example, 100 kHz (or middle frequency) and provides a smooth DC current to the battery 215. The PB converter 226 generates a targeted battery voltage/current to charge a traction battery 215. As noted, above the PB converter 226 is combined with the secondary side 107 (e.g., the switches 214a-214d). The controller 218 employs a control strategy (and control blocks) which enables the control of the PB converter 226 to be integrated with control of the secondary side 104b. It is recognized the secondary side 107 includes the DAB stages 104b, the transformer secondary 106b, and the PB converter 226.

It is recognized that the apparatus 200 may be used in connection with a 22 kW, 400V variant assuming that various values for the electrical devices illustrated on the apparatus 200 are utilized. The battery 215 is operably coupled to a middle point of the secondary-side transformer 106b via the inductor 227 and the capacitor 222 is coupled to a secondary bus (e.g., to the switches 21 via the inductor 227) which is capable of being charged to around 800V.

A mains supply 516 provides current $i_{ac}$ (t) (or voltage $v_{ac}$ (t)) to the first filter 202 which is then provided to the transformer 106. A plurality of current monitors 518 may be operably coupled with the controller 218 to sense the current $i_{ac}$ (t) which may be a detected (or detectable) current portion. Such sensing of the current $i_{ac}$ (t) is not performed until after the first filter 202 filters the input from the mains supply 516. It is recognized that the first filter 202 provides a capacitance $C_p$ and that such a capacitance does not pertain to an actual value of a capacitor that is provided on the first filter 202. Rather, the first filter 202 inherently forms a capacitor $C_p$ which is characterized by a capacitance and such a capacitance corresponds to an equivalent input capacitance that may be considered a design parameter that is characterized in development.

Given that the first filter 202 and the corresponding capacitance of the capacitor $C_p$ are positioned before the sensing of the current $i_{ac}$, portions of the current $i_{ac}$ may not be detected due to the capacitor $C_p$ being charged and discharged. The undetected amount of the current $i_{ac}$ across the capacitor $C_p$ may not be visible to the current monitors 518 (or the controller 218). In this case, the controller 218 may not be equipped to compensate for the undetected amount of current of $i_{ac}$. In other words, the controller 218 may not be aware of the actual $i_{ac}$ that is being provided by the grid (or the main supply 516) as a portion of the actual current, $i_{ac}$ may not be detectable (or sensed by the current monitors 516). This condition causes a distortion on the incoming AC current sinewave (e.g., $i_{ac}$) at the input of the apparatus 200 (or the OBC). The undetected portion of $i_{ac}$ may be relevant when the apparatus 200 operates in light load conditions (e.g., a low amount of current is being requested by OBC 200 (i.e., the controller 218) from the mains supply 516). In this case, a Total Harmonic Distortion (THD) may degrade for the apparatus 200.

The controller 218 may mitigate the negative impact of the undetected amount of current of $i_{ac}$ with the disclosed control strategy. For example, the controller 218 may compensate for the undetected amount of current of $i_{ac}$ by characterizing (or determining) the current across the capacitor $C_p$, $i_{Cp}$ based on the following equation:

$$i_{Cp} = 2C_p \frac{d}{dt}|v_{ac}(t)| \quad \text{(Eq. 1)}$$

As shown, the controller 218 determines $i_{Cp}$ the current across the capacitor $C_p$ based on the sensed $V_{ac}$ and capacitance of the capacitor $C_p$ that form the filter 202. The current $i_{Cp}$ may generally correspond to the undetected amount of current of $i_{ac}$. Once the controller 218 determines $i_{Cp}$, the controller 218 compensates for the undetected amount of current for $i_{ac}$ by adding a compensation current (e.g., Iac_obj_PHx) ((or first compensation signal) to the current, $i_{ac}$. This will be discussed in more detail in connection with FIG. 10.

Figure 8:
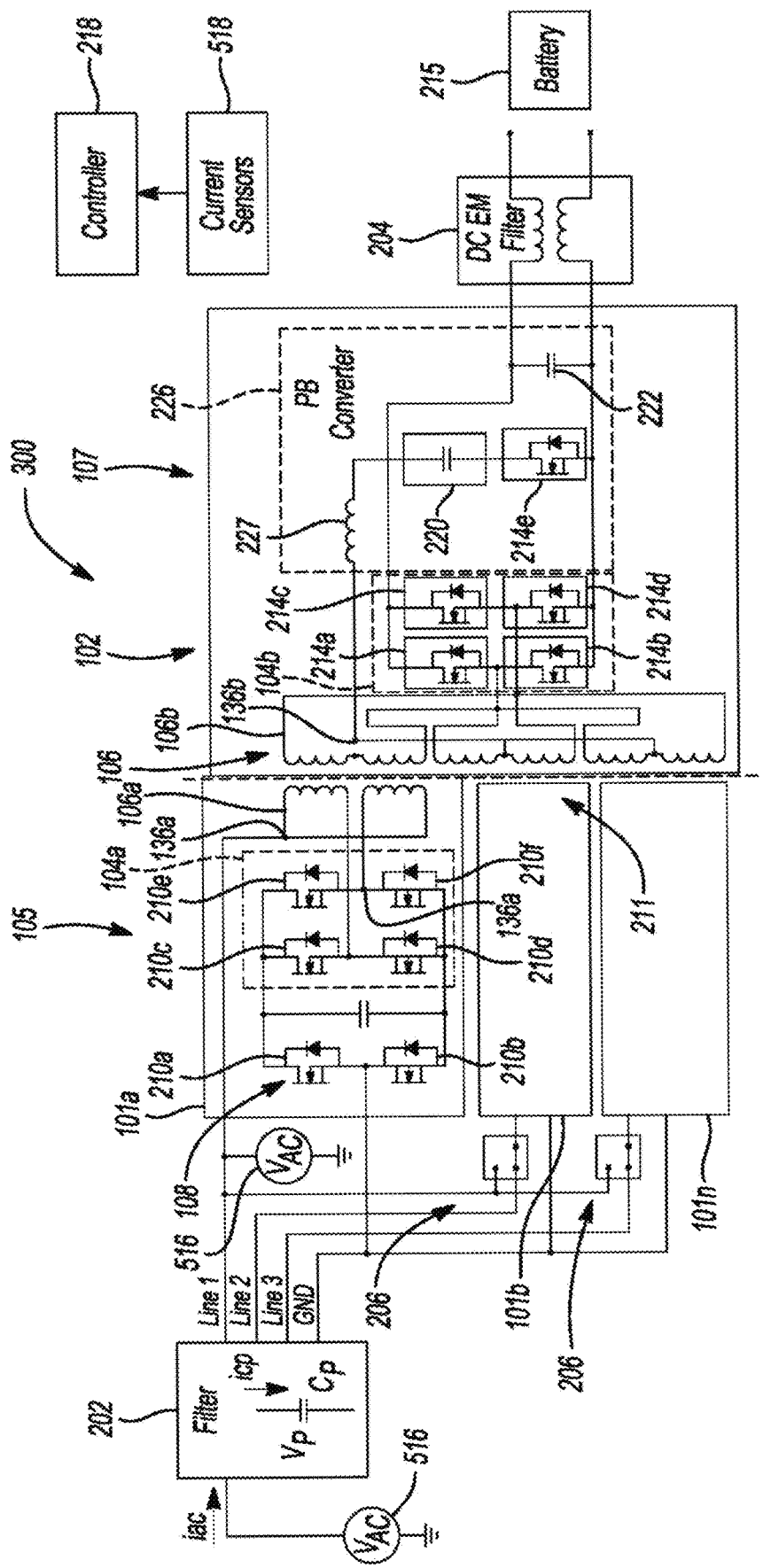
FIG. 8 depicts another apparatus for a single stage OBC (e.g., 11 kW 800V variant) with the integrated PB in accordance with another embodiment.

FIG. 8 depicts an apparatus 300 for a single stage OBC (e.g., 11 kW 800V variant) with the integrated PB converter 226 in accordance with one embodiment. The apparatus 300 is generally similar to the apparatus 200 as described in connection with FIG. 7. The battery 215 is coupled to the secondary bus (e.g., to the switches 214) which differs from FIG. 7. The apparatus 200 of FIG. 7 generally provides an output voltage of 400V whereas the apparatus 300 of FIG. 8 generally provides an output voltage of 800V. The capacitor 222 is coupled to a middle point of the secondary-side transformer 106b on the secondary side 107 via the inductor 127 and the capacitor 222 may be charged to 800V. These aspects of FIG. 8 differ from that illustrated in FIG. 7. It is recognized that the apparatus 300 may be used in connection with a 22 kW, 800V variant assuming that various values for the electrical devices illustrated on the apparatus 200 are utilized. It also recognized that controller 218 determines $i_{Cp}$ (i.e., the current across the capacitor $C_p$ and also referred to as the undetected amount of current of $i_{ac}$) based on the sensed $V_{ac}$ and capacitance of the capacitor $C_p$ that form the filter 202. Once the controller 218 determines $i_{cp}$, the controller 218 compensates for the undetected current by adding a compensation current (e.g., Iac_obj_PHx_compensated) as discussed above. This will be discussed in more detail in connection with FIG. 10.

Figure 9:
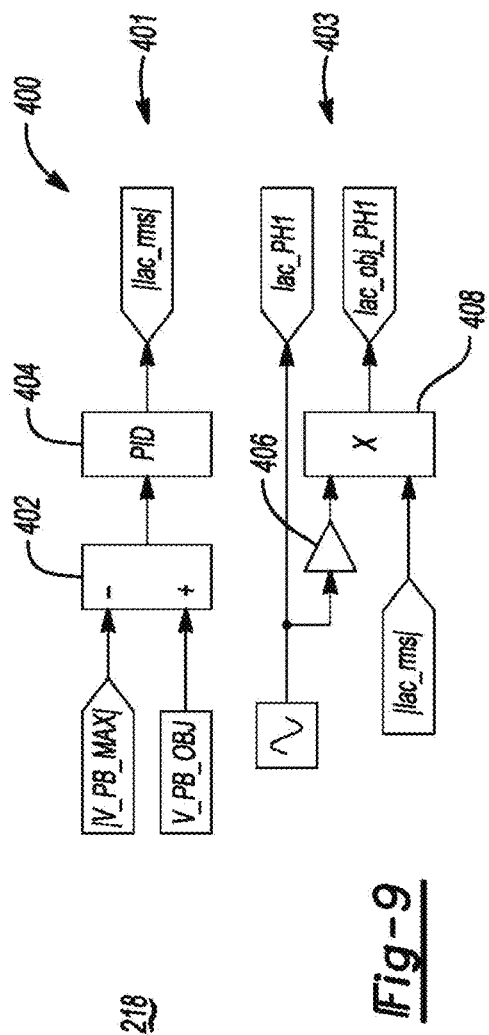
FIG. 9 depicts various control blocks implemented within a controller of the OBC in accordance with one embodiment.

FIG. 9 depicts a first control block 400 positioned within the controller 218 in accordance with one embodiment. The controller 218 utilizes the first control block 400 to control various aspects of the apparatus 200 and 300. These aspects will be discussed in more detail below. The first control block 400 includes a first portion 401 and a second portion 403. The first portion 401 includes an adder 402 and a proportional, integral, derivative (PID) controller 404. The controller 218 determines a maximum peak voltage of the PB converter 226 (e.g., V_PB_max) and provides the same to the adder 402. The maximum peak voltage of the PB converter 226 generally corresponds to the maximum voltage at the capacitor 220. It is recognized that one or more voltage sensors (not shown) may be positioned about the PB converter 226 to provide the maximum peak voltage of the PB converter 226 (e.g., the voltage across the capacitor 220). The controller 218 is operably coupled to the one or more voltage sensors to provide the maximum peak voltage of the PB converter 226. The controller 218 also provides a maximum voltage that is allowed to be stored on the capacitor 220 (e.g., 800 for the system 200 and 300) of the PB converter 226 (e.g., V_PB_OBJ) to the adder 402. V_PB_OBJ is a design parameter based on the selected pulsating buffer capacitor 220. For example, V_PB_OBJ is the maximum voltage by design the secondary side 107 can operate (e.g., 950V (220 typ. is 1100V)). V_PB_MAX is variable, obtained from the capacitor 220 max peak voltage (e.g., see FIG. 14, PB peak voltage 708). V_PB_OBJ is selected to optimize the operating conditions for the apparatus 200 and 300 to optimize the cost for the capacitor 220 considering its technology and maximum voltage. Generally, the value for V_PB_OBJ is pre-stored in the controller 218. The adder 402 subtracts V_PB_max from V_PB_OBJ and provides a difference between V_PB_max from V_PB_OBJ to the PID controller 406. The PID controller 404 generates a desired root mean square value of the current input (e.g., Iac_Rms) which later corresponds to a desired input current request for the driving the switches 210 and 214 after operations are performed on the second portion 403 and a first portion 451 (see below) that provides control parameter FI on the primary and the secondary sides 105, 107 of the apparatus 200 and 300 (e.g., power plant).

Figure 10:
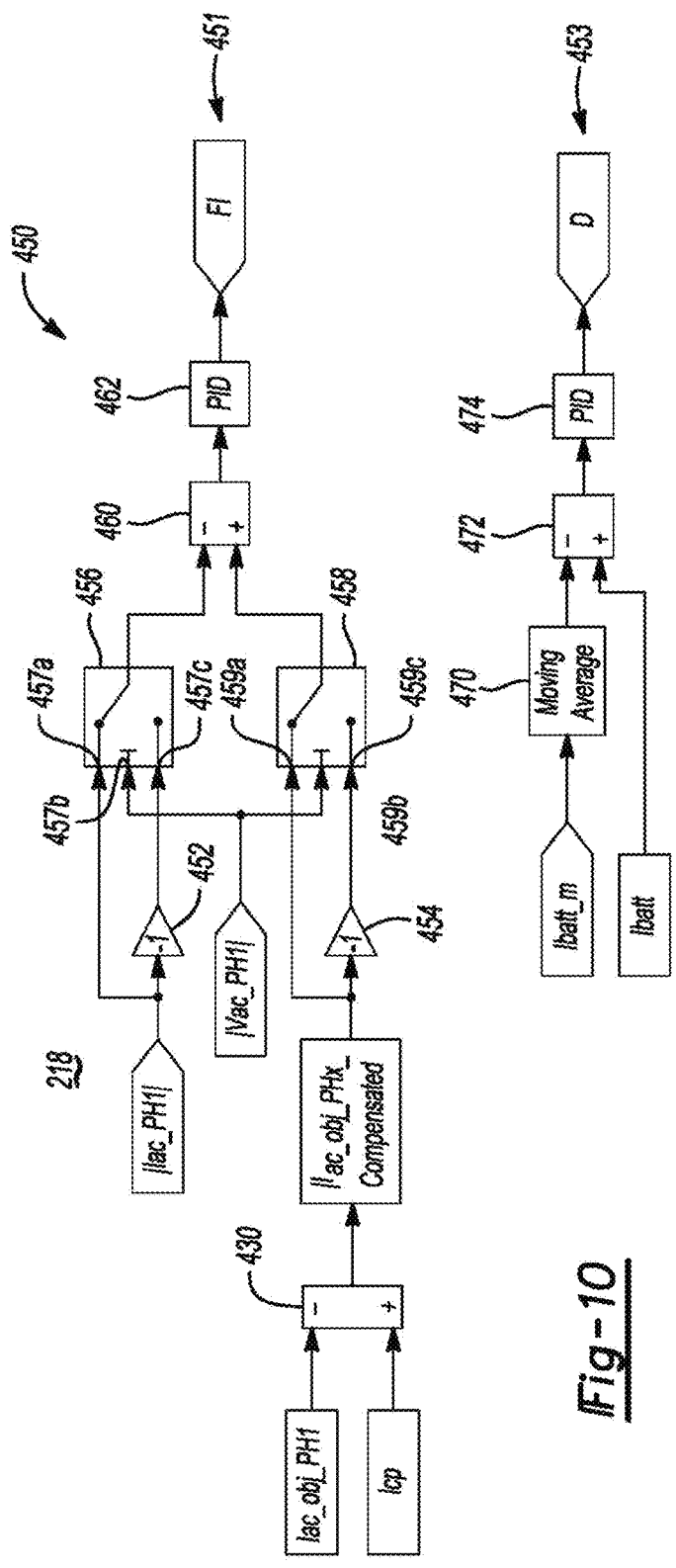
FIG. 10 depicts additional various control blocks implemented within the controller in accordance with one embodiment.

The second portion 403 of the first control block 400 includes a gain circuit 406 and a multiplier circuit 408. An oscillating waveform (e.g., sine wave) is provided to the gain circuit 406 and to the multiplier circuit 408. The multiplier circuit 408 multiplies the oscillating waveform with the desired Rms current input (e.g., Iac_Rms) as generated by the PID controller 404 to generate a transformed Iac_Rms current (or Iac_Obj_PH1 where PH1 corresponds to Line 1). This is performed for each of the converters 101a-101n in the system 700 or 800. It is recognized that the operations as set forth and performed in connection with FIGS. 9-10 are performed for each converter 101. The first control block 400 provides the AC current to the power plant when the apparatus 200 or 300 is discharging current (i.e., the battery 14 is providing power back to the grid (or main supply 16)) and provides Iac_Obj_PH1 to the power plant when the apparatus 200 or 300 is charging current to the battery 14.

FIG. 10 depicts a second control block 450 positioned within the controller 218 in accordance with one embodiment. The controller 218 also utilizes the second control block 450 to control aspects of the apparatus 200 or 300. The second control block 450 includes a first portion 451 and a second portion 453. The first portion 451 includes an adder 430, a first gain circuit 452, a second gain circuit 454, a first multiplexer circuit 456, a second multiplexer circuit 458, a first comparator 460, and a first PID controller 462. The first multiplexer 456 includes inputs 457a-457c and the second multiplexer includes inputs 459a-459c. The first gain circuit 452 receives Iac_PH1 which corresponds to a measured AC current in Line 1 (see FIGS. 7 and 8 which depicts Line 1, Line 2, Line 3, and Neutral inputs from mains supply) (see outputs from AC EMI filter 202).

In the event, Iac_PH1 is positive, this signal is passed to the first input 457a of the first multiplexer circuit 456. In the event, Iac_PH1 is negative, this signal is passed to the first gain circuit 452 where it is multiplied with a negative unity value. Vac_PH1 generally represents a voltage that indicates when to select the input 457a or 459a (e.g., when Vac_PH1 is positive) or the input 457c or 459c (e.g., when Vac_PH1 is negative). The output of the first gain circuit 452 (e.g., a positive Iac_PH1) is then transmitted to the third input 457c of the first multiplexer 456.

The second gain circuit 454 receives an output or signal (e.g., Iac_obj_PHx_compensated) from the adder 430. In general, the signal Iac_obj_PHx_compensated corresponds to a compensation value to compensate for the current $I_{Cp}$ (i.e., the undetected amount of current $i_{ac}$) that is due to the presence of the capacitor Cp at the filter 202. The current $I_{Cp}$ was discussed above in connection with FIGS. 7 and 8. The adder 430 obtains a difference between Iac_Obj_PH1 and $I_{Cp}$ (i.e., the current across the capacitor Cp presented by the filter 202 (also known as the undetected amount of current of $i_{ac}$)) to generate the signal Iac_obj_PHx_compensated.

The first comparator 460 compares the outputs from the first and the second multiplexers 456, 458 (e.g., Iac_PH1 and Iac_Obj_PH1) to one another. If the comparator 406 provides a difference from the outputs of the multiplexers 456, 458; the first PID controller 462 applies a compensation factor and generates a signal or parameter, FI which corresponds to a power plant operation variable. The variable FI corresponds to a phase shift between a control signal for activating/deactivating the switches 210 on the primary side 105 and a control signal for activating/deactivating the switches 214 on the secondary side 107. The variable FI also takes into account the current across the capacitor Cp as presented by the filter 202. For example, the calculated variable FI may be a function of the power to be transferred towards the HV battery 215 (e.g., in a vehicle charging mode) or to the grid (e.g., in a vehicle discharging mode). As the power at the primary side 105 is function of $i_{ac}$ and $v_{ac}$, the variable FI takes into account also the current that is consumed based on the charging and discharging of the capacitor Cp as such current is taken into account by the first portion 451 considered in the control loop with the $I_{cp}$ correction.

For example, in reference to FIGS. 7 and 8, the controller 218 provides a single primary control signal to the switches 210c, 210d, 210e, and 210f of the DAB stage 104a on the primary side 105 and a single secondary control signal to the switches 214a, 214b, 214c, and 214d of the DAB stage 104b on the secondary side 107. Thus, in this regard the variable FI corresponds to a phase shift between the single primary control signal and the single secondary control signal. It is recognized that the controller 218 generates and transmits a single primary control signal to the switches 210c, 210d, 210e and 210f for each modular converter 101a-101n (or rail) and also generates and transmits a single secondary control signal to the switches 214a, 214b, 214c, and 214d for each modular converter 101a-101n (or rail). It is further recognized that the single primary control signal selectively activates any one or more of the switches 210c, 210d, 210e, and 210f and/or selectively deactivates any one or more of the switches 210c, 210d, 210e, and 210f. Similarly, it is further recognized that the single secondary control signal selectively deactivates any one or more of the switches 214a, 214b, 214c, and 214d and/or selectively deactivates any one or more of the switches 214a, 214b, 214c, and 214d.

For example, with respect to the controller 218 providing a single primary control signal to the switches 210c, 210d, 210e, and 210f, the single primary control signal is provided by the controller 218 to drive all the switches 210c, 210d, 210e, and 210f with, for example, a fixed duty cycle of 50%. In general, each half bride of switches may be commanded with the same pulse width modulated (PWM) signal via a driver (not shown) that activates a gate of a high side for the switch 210c, 210d, 210e, and 210f when a low side of the switch 210c, 210d, 210e, and 210f is low.

For the single secondary control signal, the controller 218 has information corresponding to a working frequency of the switches 210c, 201d, 210e, and 210f (e.g., the duty cycle (control variable D)) and the control variable FI of the single primary control signal. This aspect defines the single secondary control signal. In general, any half bridge or each full bridge (or DAB stage 104a and 104b), is driven via single chip to ensure switching dead times. The dead time may be a very short time compared to a working period where both switches in a half bridge (or bridge branch) are OFF (e.g., one switch was ON and has just switched OFF and the other is OFF and will switch to ON). This is to ensure that by no means (e.g., delays due to capacitances), the two switches will be ON and such a condition may cause a short circuit and may blow out both components. On the other hand, the operation is such that the high switch of a first bridge branch is activated at the same time as the low switch of the second bridge branch, and vice versa. The low switch of the first bridge branch is activated at the same time as the high switch of the second bridge branch. Knowing all of this, the driver chip control input(s) (as defined by a chip manufacturer), the controller 218 translates the single primary control signal and the single secondary control signal into the driver chip control input.

Referring back to FIG. 10, in a similar fashion, Iac_Obj_PH1 is transmitted to the first input 459a of the second multiplexer 458. As noted in connection with FIG. 9, Iac_Obj_PH1 is provided (or generated) by the second portion 403 of the first control block 403. In the event, Iac_Obj_PH1 is positive, this signal or parameter is passed to the first input 459a of the second multiplexer circuit 458. In the event, Iac_Obj_PH1 is negative, this signal or parameter is passed to the second gain circuit 454 where Iac_Obj_PH1 is multiplied with a negative unity value. The output of the first gain circuit 452 (e.g., a positive Iac_PH1) is then transmitted to the third input 459c of the first multiplexer 456.

The second portion 453 includes an average block 470, a second comparator 472, and a third PID controller 474. Sensed or measured High Voltage (HV) battery current (Ibatt_m) is provided to the average block 470. The average block 470 is a moving average block that takes a predetermined number of samples of Ibatt_m and takes the average of the predetermined number of samples and provides a corresponding output to the second comparator 472. The second comparator 472 receives a charging target current (Ibatt) for the battery 215. The second comparator 472 takes the difference between Ibatt_m and Ibatt and provides an output to the third PID controller 474. The third PID controller 474 adapts the difference between current values and generates the respective compensating D value. The third PID controller 474 generates an output signal (or control variable) D which corresponds to a control signal to control switches 214 on the secondary side 107 at a corresponding duty cycle to provide the desired amount of current to the battery 215. The controller 218 adjusts the control variable D dynamically which enables the PB converter 226 to be integrated with the secondary side 107. For example, previous implementations provided for a fixed D which necessitated additional electronics. Given that the embodiments disclosed herein provides a dynamically controlled D that changes or is variable (e.g., variable duty cycle), there is no longer a need to have a separate PB converter and a DAB secondary side 104b.

FIG. 11 depicts one example of an OBC 500 that exhibits bi-directional current flow in accordance with one embodiment. The diagram of FIG. 11 corresponds to a single rail (or converter 101). The OBC 500 includes a DAB primary side 505, a DAB secondary side 507, a rectifier 528, and a PB converter 526 positioned on and integrated with the DAB secondary side 507. The rectifier 528 includes switches 502a-502b. The primary side 505 includes switches 510a-510d ("500") and a primary 503 of a transformer 506. The secondary side 507 includes switches 514a-514e and a secondary 507 of the transformer 506. The PB converter 526 includes the switch 514e, capacitors 520 and 522, and an inductor 527. A battery 515 receives power from the PB converter 526 while the OBC 500 converts AC power form the mains supply 516. It is recognized that the OBC 500 is a bi-directional an in one direction (or when the OBC 500 is discharging energy or is in a discharging state), the OBC 500 enables the battery 515 to provide a voltage to the secondary side 507 and energy is delivered back through the primary side 505 to provide an AC output on the grid. In the other direction (or when the OBC 500 is in a charging stage (AC DC conversion to store DC energy on battery 515), the OBC 500 provides AC energy from the mains supply 516 to the primary side 505 where an AC output is provided therefrom to the secondary side 507 (and the PB converter 526) to generate a DC output for storage on the battery 515. Variables $i_{ac}$ as depicted on the primary side 505 corresponds to the AC current generated by the main supply 516, $V_{o,p}$ corresponds to the voltage generated on the primary side 505 when the switches 510 are controlled via the controller 218, $V_{o,s}$ corresponds to a voltage generated on the secondary side 507, $i_{batt}$ corresponds to the charging current provided by the secondary side to the battery 515 during the charging state. The current $i_{ac}$ is negative when the OBC 500 is in the discharging state. Similarly, the parameter FI as determined by the second control block 450 of the controller 210 as set forth in FIG. 10 is also negative when the OBC 500 is in a discharging state.

It also recognized that controller 218 determines $i_{Cp}$ (i.e., or the undetected amount of current of $i_{ac}$) based on the sensed $V_{ac}$ and capacitance of the capacitor $C_p$ that form the filter 202. Once the controller 218 determines $i_{Cp}$, the controller 218 compensates for the undetected amount of current by adding a compensation current (e.g., Iac_obj_PHx_compensated) as discussed above.

FIG. 12 illustrates a voltage output ($V_{o,p}$) 600 across a primary side of the OBC 500 (or the apparatus 200 and/or 300) and a voltage output ($V_{o,s}$) 602 across a secondary side of the OCB 500 (or the apparatus 200 and/or 300) in accordance with one embodiment. All references to the elements or features of FIG. 11 as noted herein also apply to the features or elements of FIGS. 7 and 8. The controller 218 controls the switches 510 (or 210) at a corresponding switching frequency to generate the voltage across the primary side 505 (or 105) $V_{o,p}$ as illustrated in FIG. 12. The controller 218 controls the switches 514 (or 214) to generate the voltage across the secondary side 507 (or 107) $V_{o,s}$ with a duty cycle based on D as determined by the second portion 453 of the second control block 450 as depicted in FIG. 10. The duty cycle, D as generated by the controller 218 to control the switches 514 (214) may compensate for a 50/60 Hz ripple in battery current $i_{batt}$. The duty cycle at which the controller 218 controls the switches 510 (or 210) may be fixed at, for example, 0.5.

The parameter FI as generated by the second control block 450 of the controller 218 generally corresponds to a power correction factor and may be used to ensure proper mains supply 516 and power transfer from the primary side 105 (or 505) to the secondary side 107 (or 507). As stated above, the parameter FI corresponds to a phase shift between a control signal for activating/deactivating the switches 210 on the primary side 105 and a control signal for activating/deactivating the switches 214 on the secondary side 107. As shown, in FIG. 12, parameter FI provides a shift between the voltage $V_{o,p}$ and $V_{o,s}$. If the parameter FI is equal to 0 for any of the plurality of modular converters 101a-101n (or "101") for the apparatus 200 or 300, then the power Iac,obj becomes zero and the corresponding converter 101 that exhibits FI being equal to zero is not providing power. It is recognized that the modular converters 101 may operate independently of one another.

Figure 13:
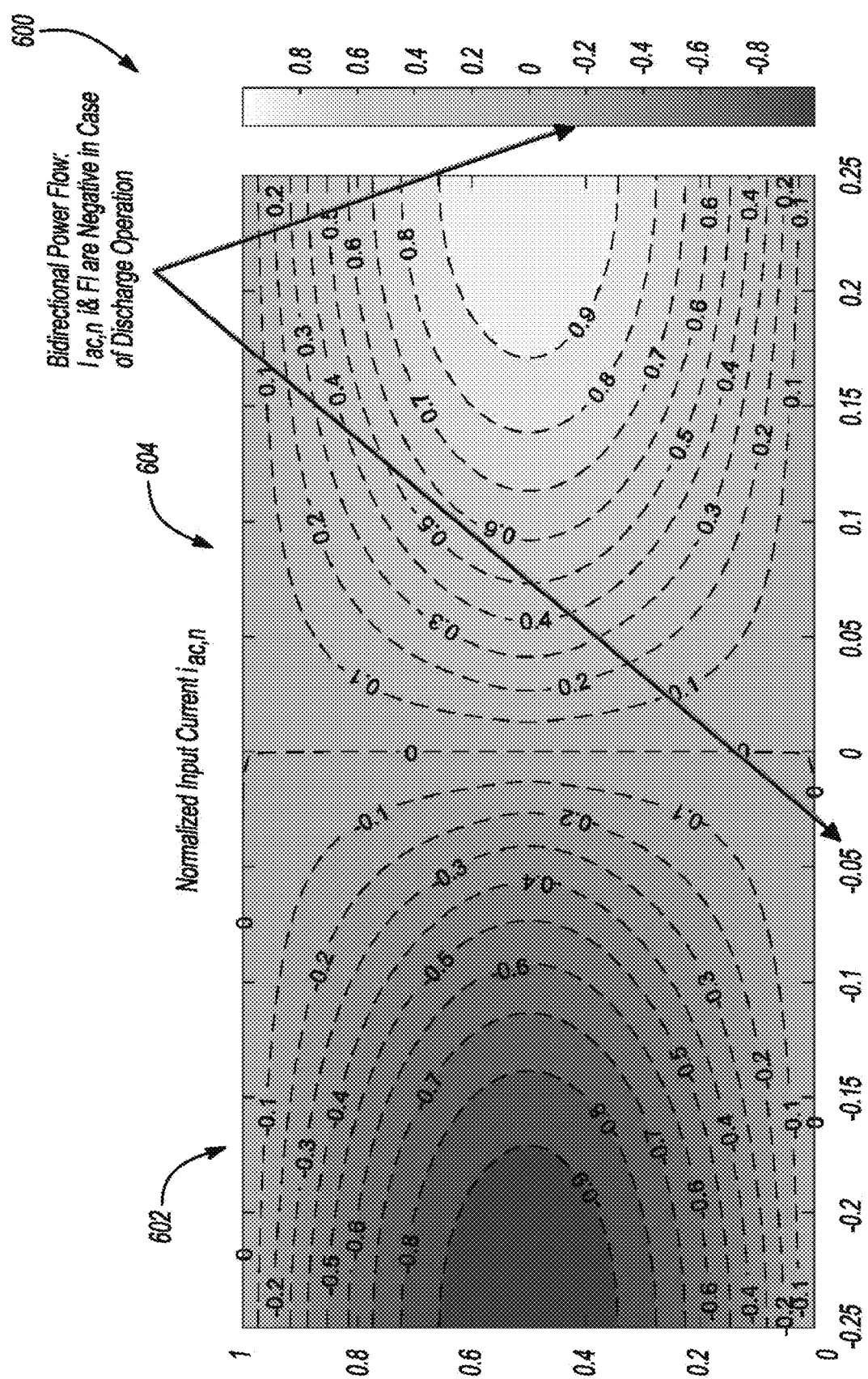
FIG. 13 depicts a normalized input current $i_{ac,n}$ in accordance with on embodiment.

FIG. 13 corresponds to a plot 600 that depicts a normalized input current $i_{ac,n}$ for parameters D and FI in accordance with one embodiment. The plot 600 is generally divided into a first portion 602 and a second portion 604. The first portion 602 exhibits a corresponding normalized value for D and FI when the OBC 500 (including the apparatus 200 and/or 300) is in the discharging state (e.g., the vehicle battery 515 is providing voltage energy from the secondary stage 507 to the primary stage 505 or the OBC 500 and/or the apparatus 200 and/or 300 convert the DC voltage to an AC voltage). In the discharging state, the plot 600 depicts that parameter FI exhibits a negative value. The second portion 604 exhibits a corresponding normalized value for D and FI when the OBC 500 (e.g., the OBC 500 and/or the apparatus 200 and 300 invert the incoming AC energy from the mains supply 516 to DC energy for storage on the battery 515). In the charging state, the plot 600 depicts that FI exhibits a positive value. It bears mentioning that the values shown for D and FI are normalized values.

The plot 600 may be interpreted in the following manner. The parameter FI controls both the direction of the input current and its magnitude, whereas D allows a varying of the magnitude for a given input current direction. For example, assume that D is equal to 0.4 and FI is equal to −0.05 (see first portion 602), then the normalized input current (e.g., $i_{ac,n}$) is equal to 0.3 (e.g, 0.32). In this case, 30% of the current $i_{ac}$ is transmitted back to the main supply 516 (or grid) from the OBC 500 (or the apparatus 200 or 300). Assume for example that D is equal to 0.3 and FI is equal to 0.2 (see second portion 604), then the normalized input current (e.g., $i_{ac,n}$) is equal to 0.8. In this case, 80% of the current $i_{ac}$ provided from the main supply 516 is transmitted back to the battery 515 of the OBC 500 (or the apparatus 200 or 300). The parameter FI corresponds to the phase shift between the primary full bridge (e.g., switches 510a-510d) and the second full bridge (e.g., switches 514a-514d).

Figure 14:
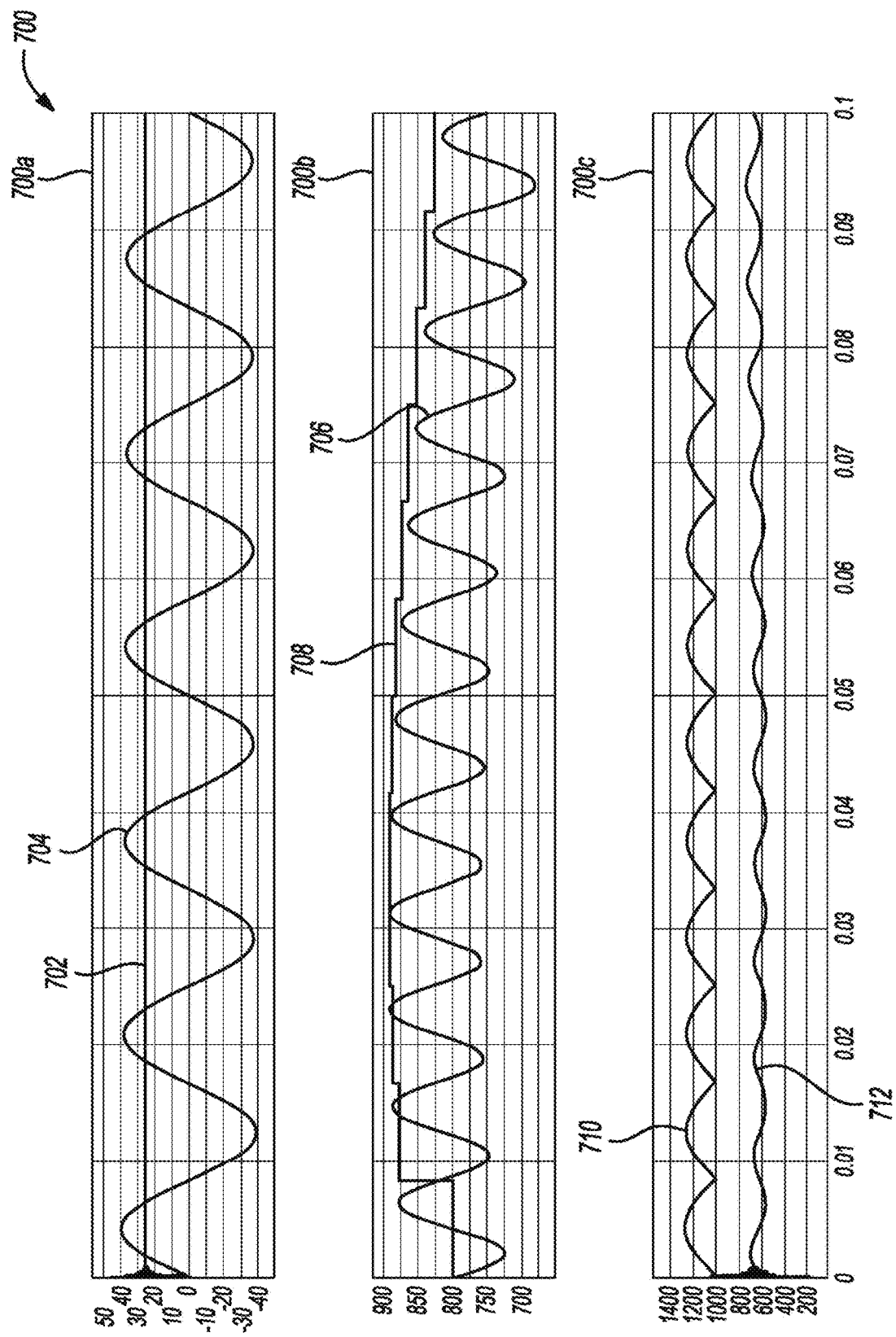
FIG. 14 illustrates various waveforms for battery current, mains current, PB voltage, PB peak voltage, FI control parameter, and D control parameter for energy flow from the mains power supply to the battery in accordance with one embodiment.

FIG. 14 illustrates a plot 700 including various waveforms for battery current 702, mains current 704, PB voltage 706, PB peak voltage 708, FI control parameter 710, and D control parameter 712 for energy flow from the mains power supply 516 to the battery 515 in accordance with one embodiment. In this case, the OBC 500 (including the apparatus 200 or 300) is in the charging state, as the FI control parameter 710 includes positive values (e.g., the FI control parameter 710 is above the zero threshold. The controller 218 modulates parameters FI and D to achieve a smooth DC output current when the vehicle is charging.

Figure 15:
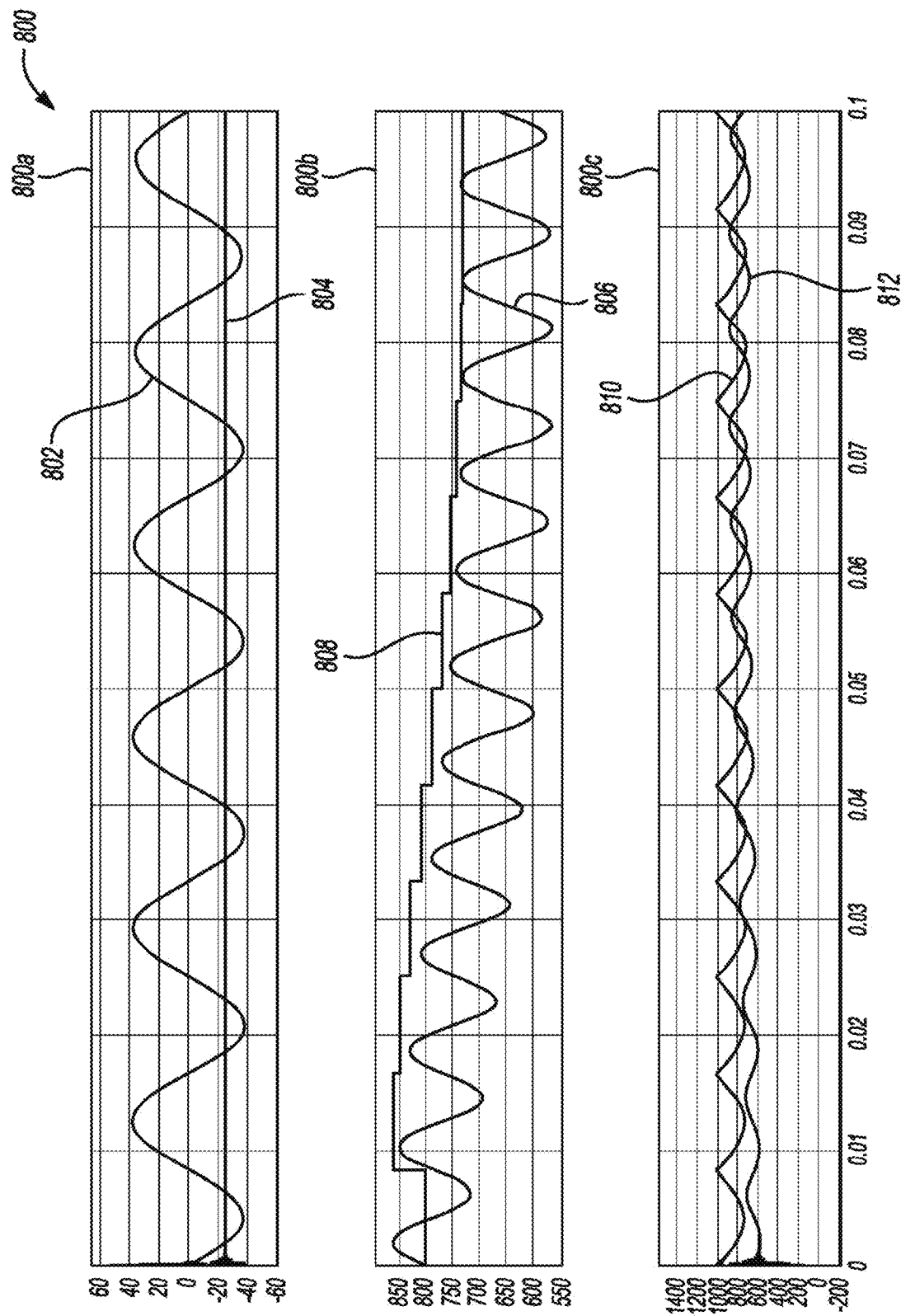
FIG. 15 illustrates various battery current, mains current, PB voltage, PB peak voltage, FI control parameter, and D control parameter for energy flow from the battery to the mains power supply in accordance with one embodiment.

FIG. 15 illustrates a plot 800 various waveforms for battery current 802, mains current 804, PB voltage 806, PB peak voltage 808, FI control parameter 810, and D control parameter 812 for energy flow from the mains power supply 516 to the battery 515 in accordance with one embodiment. In this case, the OBC 500 (including the apparatus 200 or 300) is in the discharging state, as the FI control parameter 710 includes negative values (e.g., the FI control parameter 710 is below the zero threshold of 1000 units (see y-axis of the plot 700)). Control variables FI and D are modulated following the previously defined control scheme to achieve sinusoidal mains current when the vehicle is discharging.

Figure 16:
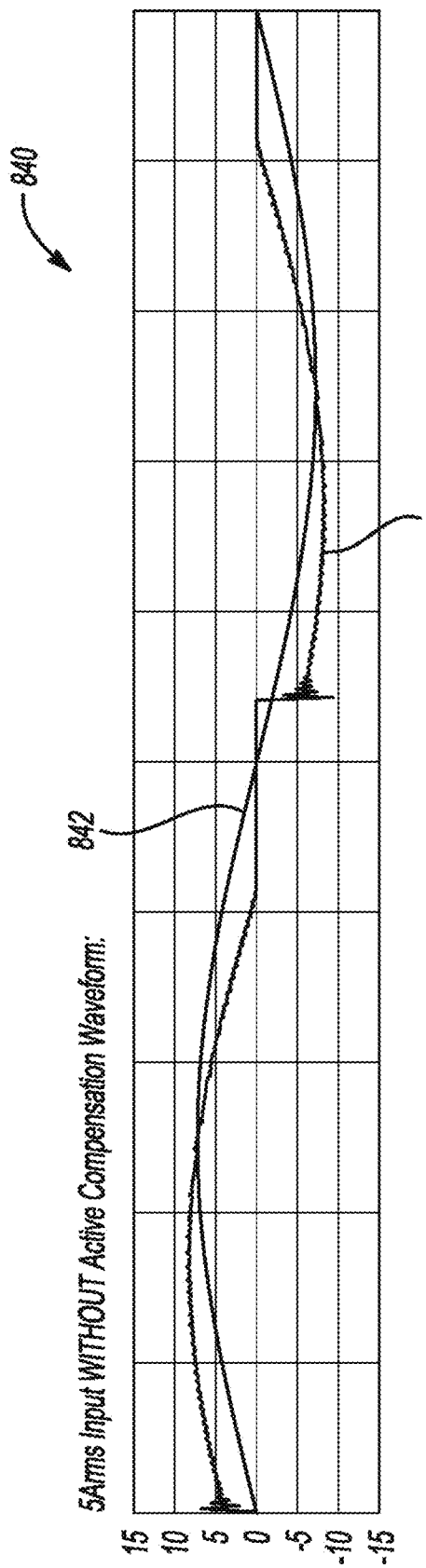
FIG. 16 depicts a plot corresponding to a desired current and current provided by a mains supply that is independent of active compensation waveform in accordance with one embodiment.

FIG. 16 depicts a plot 840 corresponding to a desired current 842 (or iac_obj (or iac, target) and current provided by mains supply 516 (e.g., $i_{ac}$) (e.g., shown at 844) without the use of the active compensation implementation as discussed in connection with FIG. 10. In this case, FIG. 16 illustrates a worsening THD condition since there is no compensation provided for the undetected amount of current for $i_{ac}$. Plot 842 generally corresponds to a 5 Arms input for $i_{ac}$ in which the undetected current for $i_{ac}$ is not compensated for. FIG. 16 generally depicts the effect of distortion on the current wave of $i_{ac}$ due to the charging and discharging of the capacitor Cp that is close to a polarity change on the voltage, $v_{ac}$. At the point the capacitor Cp changes polarity, the current Iac_obj (i.e., uncompensated current due to current at the capacitor Cp) is disturbed.

Figure 17:
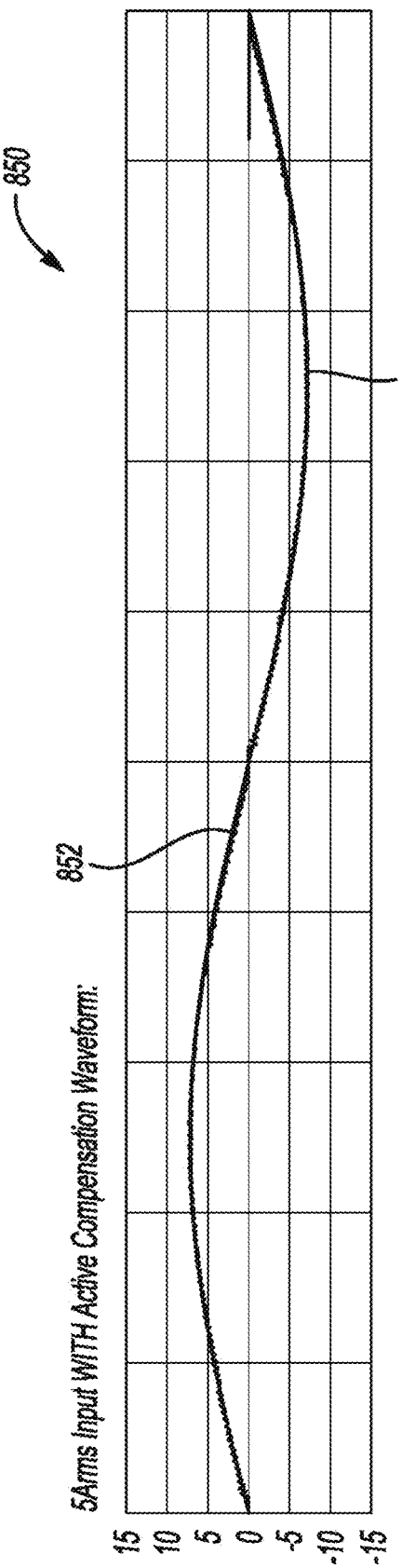
FIG. 17 depicts a plot corresponding to a desired current and current provided by the mains supply that utilizes an active compensation (or compensation value for leakage current attributed to capacitance in an input filter) as described in connection with FIG. 7 in accordance with one embodiment.

FIG. 17 depicts a plot 850 corresponding to a desired current 852 (or iac_obj (or iac, target) and current provided by mains supply 516 (e.g., $i_{ac}$) (e.g., shown at 854) that utilizes an active compensation as described in connection with FIGS. 7, 8. 9, and 10 in accordance with one embodiment. In this case, FIG. 17 illustrates an improvement in THD. FIG. 17 generally illustrates that the first portion 451 generates $I_{ac\_obj\_PHx\_compensated}$ to compensate for the leakage current $i_{Cp}$ and that such compensation is verified by the fact that $i_{ac}$ at a zero crossing smooths out.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle battery charger., comprising:
    at least one transformer having one or more primary windings and one or more secondary windings;
    a first modular converter including a first active bridge having a first plurality of switching devices being positioned with the one or more primary windings on a primary side of the vehicle battery charger to generate a first voltage signal in response to a filtered input signal;
    a second active bridge including a second plurality of switching devices being positioned with the one or more secondary windings on a secondary side of the vehicle battery charger to generate a second voltage signal that is stored on one or more batteries on a vehicle in response to the first voltage signal;
    a filter operably coupled to the first modular converter configured to provide the filtered input signal to the first modular converter in response to an input signal from a mains supply, wherein the filtered input signal includes a detectable current portion and an undetected current portion that is undetected by one or more current sensors; and at least one controller programmed to:
deteunine the undetected current portion of the filtered input signal based at least on a capacitance of the filter; and
generate control variable to compensate for the undetected current portion based on a difference between a first compensation signal and the determined undetected current portion, wherein the control variable enables the vehicle battery charger to transfer power between the first active bridge and the second active bridge.

2. The vehicle battery charger of claim 1, wherein the at least one controller includes control block having an input adder programmed to obtain the difference between the first compensation signal and the undetected current portion to generate a second compensation signal.

3. The vehicle battery charger of claim 2, wherein the first control block includes:
a plurality of multiplexer circuits programmed to receive at least the first input signal and the second compensation signal to generate a first multiplexer output signal and a second multiplexer output signal; and
a comparator programmed to obtain a difference between the first multiplexer output signal and the second multiplexer output signal to generate a difference multiplexer output signal.

4. The vehicle battery charger of claim 3, wherein the first control block includes a proportional, integral, derivative (PID) controller to apply the second compensation signal and generate the control variable, based on the difference multiplexer output signal.

5. The vehicle battery charger of claim 1, wherein the at least one controller is further programmed to selectively activate the first plurality of switching devices based on a single primary control signal to generate the first voltage signal.

6. The vehicle battery charger of claim 5, wherein the at least one controller is further programmed to selectively activate the second plurality of switching devices based on a single secondary control signal to generate the second voltage signal.

7. The vehicle battery charger of claim 6, wherein the first control variable corresponds to a phase shift between the single primary control signal and the single secondary control signal.

8. A vehicle battery charger, comprising:
at least one transformer having one or more primary windings and one or more secondary windings;
a first modular converter including a first active bridge having a first plurality of switching devices being positioned with the one or more primary windings on a primary side of the vehicle battery charger to generate a first voltage signal in response to a filtered input signal;
a second active bridge including a second plurality of switching devices being positioned with the one or more secondary windings on a secondary side of the vehicle battery charger to generate a second voltage signal that is capable of being stored on one or more batteries on a vehicle in response to the first voltage signal;
a filter operably coupled to the first modular converter configured to provide the filtered input signal to the first modular converter in response to an input signal from a mains supply of a power grid, wherein the filtered input signal includes a detectable current portion and an undetected current portion that is undetected by one or more current sensors; and at least one controller programmed to:
determine the undetected current portion of the filtered input signal based at least on a capacitance of the filter; and
generate a control variable to compensate for the undetected current portion based on a difference between a first compensation signal and the determined undetected current portion.

9. The vehicle battery charger of claim 8, wherein the at least one controller includes a control block having an adder programmed to obtain the a difference between the first compensation signal and the undetected current portion to generate a second compensation signal.

10. The vehicle battery charger of claim 9, wherein the control block comprising:
a plurality of multiplexer circuits programmed to receive the input signal and the second compensation signal to generate a first multiplexer output signal and a second multiplexer output signal; and
a comparator programmed to obtain a difference between the first multiplexer output signal and the second multiplexer output signal to generate a difference multiplexer output signal.

11. The vehicle battery charger of claim 10, wherein the control block includes a proportional, integral, derivative (PID) controller to apply the second compensation signal and generate the control variable, based on the difference multiplexer output signal.

12. The vehicle battery charger of claim 8, wherein the at least one controller is further programmed to selectively activate the first plurality of switching devices based on a single primary control signal to generate the first voltage signal.

13. The vehicle battery charger of claim 12, wherein the at least one controller is further programmed to selectively activate the second plurality of switching devices based on a single secondary control signal to generate the second voltage signal.

14. The vehicle battery charger of claim 13, wherein the control variable corresponds to a phase shift between the single primary control signal and the single secondary control signal, and wherein the control variable enables the vehicle battery charger to transfer power between the first active bridge and the second active bridge.

15. A vehicle battery charger, comprising:
at least one transformer having one or more primary windings and one or more secondary windings;
a first modular converter including a first active bridge having a first plurality of switching devices being positioned with the one or more primary windings on a primary side of the vehicle battery charger to generate a first voltage signal in response to a filtered input signal;
a second active bridge including a second plurality of switching devices being positioned with the one or more secondary windings on a secondary side of the vehicle battery charger to generate a second voltage signal that is stored on one or more batteries on a vehicle in response to the first voltage signal;
a filter operably coupled between a mains supply of a grid and the first modular converter, wherein the filter is configured to provide the filtered input signal to the first modular converter in response to an input signal from the mains supply and wherein the filtered input signal includes a detectable current portion and an undetected current portion that is undetected by one or more current sensors; and at least one controller programmed to:

deteimine the undetected current portion of the filtered input signal based at least on a capacitance of the filter; and generate a control variable to compensate for the undetected current portion based on a difference between a first compensation signal and the determined undetected current portion, wherein the control variable enables the vehicle battery charger to transfer power between the first active bridge and the second active bridge.

16. The vehicle battery charger of claim 15, wherein the at least one controller includes a control block having an adder programmed to obtain the difference between the first compensation signal and the undetected current portion to generate a second compensation signal.

17. The vehicle battery charger of claim 16, wherein the control block includes:

a plurality of multiplexer circuits programmed to receive the input signal and the second compensation signal to generate a first multiplexer output signal and a second multiplexer output signal; and a comparator programmed to obtain a difference between the first multiplexer output signal and the second multiplexer output signal to generate a difference multiplexer output signal.

18. The vehicle battery charger of claim 17, wherein the control block includes a proportional, integral, derivative (PID) controller to apply the second compensation signal and generate the control variable, based on the difference multiplexer output signal.

19. The vehicle battery charger of claim 15, wherein the at least one controller is further programmed to selectively activate the first plurality of switching devices based on a single primary control signal to generate the first voltage signal.

20. The vehicle battery charger of claim 19, wherein the at least one controller is further programmed to selectively activate the second plurality of switching devices based on a single secondary control signal to generate the second voltage signal.

* * * * *

UNITED STATES PATENT AND TRADEMARK OFFICE
CERTIFICATE OF CORRECTION

PATENT NO. : 12,074,470 B2
APPLICATION NO. : 17/527868
DATED : August 27, 2024
INVENTOR(S) : Rafael Jimenez Pino et al.

Page 1 of 1

It is certified that error appears in the above-identified patent and that said Letters Patent is hereby corrected as shown below:

In the Claims

Column 19, Lines 5-6, Claim 1:
After "at least one controller programmed to:"
Delete "deteunine" and
Insert -- determine --.

Column 19, Line 21, Claim 3:
After "The vehicle battery charger of claim 2, wherein the"
Delete "first".

Column 19, Lines 62-63, Claim 8:
After "generate a second voltage signal that is"
Delete "capable of being".

Column 20, Line 16, Claim 9:
After "adder programmed to obtain the"
Delete "a".

Column 21, Lines 6-7, Claim 15:
After "at least one controller programmed to:"
Delete "deteimine" and
Insert -- determine --.

Signed and Sealed this
Twenty-second Day of July, 2025

Coke Morgan Stewart
*Acting Director of the United States Patent and Trademark Office*